(12) United States Patent
Ishii

(10) Patent No.: US 7,881,553 B2
(45) Date of Patent: Feb. 1, 2011

(54) IMAGE PROCESSING APPARATUS, IMAGE PROCESSING METHOD, AND COMPUTER PROGRAM PRODUCT

(75) Inventor: Hiroshi Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1091 days.

(21) Appl. No.: 11/636,688

(22) Filed: Dec. 6, 2006

(65) Prior Publication Data
US 2007/0127837 A1 Jun. 7, 2007

(30) Foreign Application Priority Data
Dec. 6, 2005 (JP) .............................. 2005-352559

(51) Int. Cl.
*G06K 9/38* (2006.01)
*G06K 9/40* (2006.01)
*H04N 1/40* (2006.01)

(52) U.S. Cl. ...................... 382/270; 382/274; 382/261; 358/466

(58) Field of Classification Search ................. 382/270
See application file for complete search history.

(56) References Cited

U.S. PATENT DOCUMENTS

| | | | | |
|---|---|---|---|---|
| 4,193,095 A | * | 3/1980 | Mizushima | ................. 348/800 |
| 4,468,703 A | * | 8/1984 | Fujiwara et al. | ............. 358/464 |
| 5,396,584 A | * | 3/1995 | Lee et al. | .................... 345/589 |
| 5,712,929 A | * | 1/1998 | Kawamura et al. | .......... 382/270 |
| 6,160,921 A | * | 12/2000 | Marcu | ....................... 382/252 |
| 6,538,768 B2 | * | 3/2003 | Shibahara et al. | ............ 358/1.9 |
| 6,556,707 B1 | | 4/2003 | Yagishita et al. | |
| 6,608,700 B1 | * | 8/2003 | Mantell | ...................... 358/1.9 |
| 6,633,406 B1 | * | 10/2003 | Imaizumi et al. | ........... 358/1.18 |
| 6,693,724 B1 | * | 2/2004 | Min | ........................... 358/1.9 |
| 6,999,201 B1 | * | 2/2006 | Shimizu | .................... 358/3.04 |
| 7,088,472 B1 | | 8/2006 | Okubo et al. | |
| 7,167,190 B2 | * | 1/2007 | Ito et al. | ..................... 345/690 |
| 7,265,795 B2 | * | 9/2007 | Ohyama et al. | ............. 348/675 |
| 2003/0169455 A1 | * | 9/2003 | Takahashi et al. | .......... 358/3.03 |
| 2004/0001232 A1 | * | 1/2004 | Damera-Venkata et al. | 358/3.06 |
| 2004/0196478 A1 | * | 10/2004 | Imafuku et al. | ............. 358/1.9 |
| 2004/0257622 A1 | | 12/2004 | Shibaki et al. | |
| 2005/0116981 A1 | * | 6/2005 | Faken et al. | ................... 347/19 |
| 2005/0259296 A1 | * | 11/2005 | Faken et al. | ................ 358/3.04 |
| 2006/0055639 A1 | * | 3/2006 | Yamada | ....................... 345/77 |
| 2006/0077466 A1 | | 4/2006 | Ishii et al. | |

FOREIGN PATENT DOCUMENTS

JP 2001-128004 5/2001

(Continued)

*Primary Examiner*—Vikkram Bali
*Assistant Examiner*—Michelle Entezari
(74) *Attorney, Agent, or Firm*—Blakely, Sokoloff, Taylor & Zafman LLP

(57) ABSTRACT

An image processing apparatus includes a threshold selecting unit that selects a threshold based on an input gray-scale value of the target pixel. When a degree of flexibility is defined as representing a degree of the number of pixels that can take different output values as a result of threshold processing on the pixels with the same input gray-scale value, the threshold selecting unit selects a threshold from at least two types of thresholds associated with pixel positions and having the same period and different degrees of flexibility.

10 Claims, 18 Drawing Sheets

FOREIGN PATENT DOCUMENTS

| | | |
|---|---|---|
| JP | 2003-153001 | 5/2003 |
| JP | 3431778 | 5/2003 |
| JP | 3431779 | 5/2003 |
| JP | 2003-219160 | 7/2003 |
| JP | 2004-326613 | 11/2004 |
| JP | 2006-121596 | 5/2006 |

* cited by examiner

| y\x | 0 | 1 | 2 | 3 |
|---|---|---|---|---|
| 0 | 129 | 100 | 217 | 176 |
| 1 | 40 | 14 | 180 | 144 |
| 2 | 217 | 176 | 129 | 100 |
| 3 | 180 | 144 | 40 | 14 |

202B

| y\x | 0 | 1 | 2 | 3 |
|---|---|---|---|---|
| 0 | 144 | 116 | 240 | 192 |
| 1 | 55 | 14 | 195 | 159 |
| 2 | 240 | 192 | 144 | 116 |
| 3 | 195 | 159 | 55 | 14 |

203C

| y\x | 0 | 1 | 2 | 3 |
|---|---|---|---|---|
| 0 | 159 | 129 | 240 | 207 |
| 1 | 71 | 34 | 211 | 174 |
| 2 | 240 | 207 | 159 | 129 |
| 3 | 211 | 174 | 71 | 34 |

| y\x | 0 | 1 | 2 | 3 |
|---|---|---|---|---|
| 0 | 255 | 21 | 255 | 255 |
| 1 | 21 | 21 | 255 | 255 |
| 2 | 255 | 255 | 255 | 21 |
| 3 | 255 | 255 | 21 | 21 |

302B

| y\x | 0 | 1 | 2 | 3 |
|---|---|---|---|---|
| 0 | 255 | 21 | 255 | 255 |
| 1 | 21 | 21 | 255 | 255 |
| 2 | 255 | 255 | 255 | 21 |
| 3 | 255 | 255 | 21 | 21 |

303C

| y\x | 0 | 1 | 2 | 3 |
|---|---|---|---|---|
| 0 | 255 | 255 | 255 | 255 |
| 1 | 255 | 255 | 255 | 255 |
| 2 | 255 | 255 | 255 | 255 |
| 3 | 255 | 255 | 255 | 255 |

INPUT GRAY-SCALE VALUE

| INPUT GRAY-SCALE VALUE | THRESHOLD A | THRESHOLD B | THRESHOLD C |
|---|---|---|---|
| ... | ... | ... | ... |
| 15 | 29 | 29 | 255 |
| 16 | 30 | 30 | 255 |
| 17 | 31 | 31 | 255 |
| 18 | 32 | 32 | 255 |
| 19 | 33 | 33 | 255 |
| 20 | 34 | 34 | 255 |
| ... | ... | ... | ... |

FIG. 5

| 0/32 | 1/32 | 1/32 | 2/32 | 1/32 | 1/32 | 0/32 |
|------|------|------|------|------|------|------|
| 1/32 | 1/32 | 2/32 | 4/32 | 2/32 | 1/32 | 1/32 |
| 2/32 | 4/32 | 8/32 | ×    |      |      |      |

FIG. 6

| 0 | 1 | 1 | 2 | 1 | 1 | 0 |
|---|---|---|---|---|---|---|
| 1 | 1 | 2 | 4 | 2 | 1 | 1 |
| 2 | 4 | 8 | × |   |   |   |

| y\x | 0 | 1 | 2 | 3 |
|---|---|---|---|---|
| 0 | 4 | 3 | 8 | 6 |
| 1 | 2 | 1 | 7 | 5 |
| 2 | 8 | 6 | 4 | 3 |
| 3 | 7 | 5 | 2 | 1 |

● DOT WITH GRAY-SCALE VALUE OF 170
○ DOT WITH GRAY-SCALE VALUE OF 0

| y\x | 0 | 1 | 2 | 3 |
|---|---|---|---|---|
| 0 | 129 | 21 | 217 | 176 |
| 1 | 21 | 21 | 180 | 144 |
| 2 | 217 | 176 | 129 | 21 |
| 3 | 180 | 144 | 21 | 21 |

1202B

| y\x | 0 | 1 | 2 | 3 |
|---|---|---|---|---|
| 0 | 144 | 21 | 240 | 192 |
| 1 | 21 | 21 | 195 | 159 |
| 2 | 240 | 192 | 144 | 21 |
| 3 | 195 | 159 | 21 | 21 |

1203C

| y\x | 0 | 1 | 2 | 3 |
|---|---|---|---|---|
| 0 | 255 | 255 | 255 | 255 |
| 1 | 255 | 255 | 255 | 255 |
| 2 | 255 | 255 | 255 | 255 |
| 3 | 255 | 255 | 255 | 255 |

| y \ x | 0 | 1 | 2 | 3 |
|---|---|---|---|---|
| 0 | 255 | 21 | 255 | 255 |
| 1 | 20 | 17 | 255 | 255 |
| 2 | 255 | 255 | 255 | 21 |
| 3 | 255 | 255 | 20 | 17 |

1302B

| y \ x | 0 | 1 | 2 | 3 |
|---|---|---|---|---|
| 0 | 255 | 21 | 255 | 255 |
| 1 | 20 | 17 | 255 | 255 |
| 2 | 255 | 255 | 255 | 21 |
| 3 | 255 | 255 | 20 | 17 |

| y \ x | 0 | 1 | 2 | 3 |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |

1402B

| y \ x | 0 | 1 | 2 | 3 |
|---|---|---|---|---|
| 0 | 0 | 0 | 0 | 0 |
| 1 | 0 | 0 | 0 | 0 |
| 2 | 0 | 0 | 0 | 0 |
| 3 | 0 | 0 | 0 | 0 |

1403C

| y \ x | 0 | 1 | 2 | 3 |
|---|---|---|---|---|
| 0 | 0 | 0 | 234 | 234 |
| 1 | 0 | 0 | 234 | 0 |
| 2 | 234 | 234 | 0 | 0 |
| 3 | 234 | 0 | 0 | 0 |

1901A

| y\x | 0 | 1 | 2 | 3 |
|---|---|---|---|---|
| 0 | 15 | 15 | 255 | 15 |
| 1 | 15 | 15 | 15 | 255 |
| 2 | 255 | 15 | 15 | 15 |
| 3 | 15 | 255 | 15 | 15 |

1902B

| y\x | 0 | 1 | 2 | 3 |
|---|---|---|---|---|
| 0 | 15 | 15 | 255 | 15 |
| 1 | 15 | 15 | 15 | 255 |
| 2 | 255 | 15 | 15 | 15 |
| 3 | 15 | 255 | 15 | 15 |

1903C

| y\x | 0 | 1 | 2 | 3 |
|---|---|---|---|---|
| 0 | 255 | 255 | 255 | 255 |
| 1 | 255 | 255 | 255 | 255 |
| 2 | 255 | 255 | 255 | 255 |
| 3 | 255 | 255 | 255 | 255 |

FIG. 20

| y\x | 0 | 1 | 2 | 3 |
|---|---|---|---|---|
| 0 | × | ○ | × | × |
| 1 | ○ | ○ | × | × |
| 2 | × | × | × | ○ |
| 3 | × | × | ○ | ○ |

FIG. 21

| y\x | 0 | 1 | 2 | 3 |
|---|---|---|---|---|
| 0 | ○ | ○ | × | ○ |
| 1 | ○ | ○ | ○ | × |
| 2 | × | ○ | ○ | ○ |
| 3 | ○ | × | ○ | ○ |

FIG. 23

| 136 | 144 | 104 | 96  | 88  | 160 | 120 | 128 |
|-----|-----|-----|-----|-----|-----|-----|-----|
| 80  | 152 | 192 | 184 | 176 | 168 | 112 | 72  |
| 88  | 160 | 120 | 128 | 136 | 144 | 104 | 96  |
| 176 | 168 | 112 | 72  | 80  | 152 | 192 | 184 |
| 136 | 144 | 104 | 96  | 88  | 160 | 120 | 128 |
| 80  | 152 | 192 | 184 | 176 | 168 | 112 | 72  |
| 88  | 160 | 120 | 128 | 136 | 144 | 104 | 96  |
| 176 | 168 | 112 | 72  | 80  | 152 | 192 | 184 |

IMAGE PROCESSING APPARATUS, IMAGE PROCESSING METHOD, AND COMPUTER PROGRAM PRODUCT

PRIORITY

The present application claims priority to and incorporates by reference the entire contents of Japanese priority document, 2005-352559 filed in Japan on Dec. 6, 2005.

BACKGROUND OF THE INVENTION

1. Field of the Invention

The present invention relates to an image processing apparatus, an image processing method, and a computer program product.

2. Description of the Related Art

In image forming apparatuses, the needs for generating images with less roughness and low graininess in image quality has been increased. To meet such needs, an image processing method has been devised that uses an error diffusion process of periodically amplifying a threshold for quantizing an input gray-scale value, which is input image data, in an image space (refer to Japanese Patent Application Laid-Open No. 2001-128004).

Also, an image processing scheme has been suggested in which, when the density level of a target pixel for image processing is equal to or lower than an upper-limit density region, as the density level of the target pixel is higher, a region in which a print dot can occur is expanded (refer to Japanese Patent Application Laid-Open No. 2003-153001). According to this technology, an unbalanced local dot occurrence in a low-density region is suppressed, thereby suppressing the occurrence of texture.

However, in the image processing method disclosed in Japanese Patent Application Laid-Open No. 2001-128004, although a high-density image with excellent graininess can be generated compared with a simple error diffusion method, an image with excellent graininess cannot be obtained in a low-density image region.

FIG. 23 is an example of a dither threshold table according to a conventional example. For example, when binary quantization is performed on data of 8 bits (0 to 255) of a low-density image by using the dither threshold table shown in FIG. 23, both states of dot occurrence and non-occurrence generally occur only at pixel positions to which the lowest threshold of 72 is applied, and the probability of occurrence of the state of dot occurrence is low at other positions. That is, an output image is generated in an image space with a pixel density with the threshold of 72, which means that an output image is represented in a low-density image space compared with the case of, as in a general error diffusion process, using the same threshold at all pixel positions. This is thought to decrease dispersibility and increase graininess.

On the other hand, when binary quantization is performed on a high-density image region, both states of dot occurrence and non-occurrence generally occur only at pixel positions to which the highest threshold of 192 is applied, and the probability of occurrence of the state of dot non-occurrence is low at other positions. That is, an output image is generated in an image space with the density of the pixels with the threshold of 192. This decreases dispersibility and increases graininess.

Moreover, in the image processing scheme disclosed in Japanese Patent Application Laid-Open No. 2003-153001, in image regions other than those with low density, an output image identical to that obtained in a general error diffusion method is obtained. Therefore, as suggested in Japanese Patent Application Laid-Open No. 2001-128004, graininess and stability are inferior compared with those achieved by a mainly-dither process.

SUMMARY OF THE INVENTION

An image processing apparatus, image processing method, and computer program product are described. In one embodiment, an image processing apparatus that receives image information and determines an output gray-scale value of the image information, the image processing apparatus comprising: a corrected input-value calculating unit that calculates a corrected input value by assigning a predetermined weight to an error value near a target pixel of the image information and adding the error value to an input gray-scale value; a threshold selecting unit that selects a threshold based on an input gray-scale value of at least one of the target pixel of the image information and a pixel near the target pixel; an output gray-scale value determining unit that determines an output gray-scale value based on the corrected input value calculated by the corrected input-value calculating unit and the threshold selected by the threshold selecting unit; and an error calculating unit that calculates a difference between the output gray-scale value determined by the output gray-scale value determining unit and the corrected input value as an error value, and transmits the calculated error value to the corrected input-value calculating unit, wherein when a degree of flexibility is defined as representing a degree of the number of pixels that can take different output values as a result of threshold processing on an input image formed only with a predetermined gray-scale value, where the threshold selecting unit selects a threshold from at least two types of threshold tables with same period and different degrees of flexibility based on the input gray-scale value of at least one of the target pixel and the pixel near the target pixel.

DESCRIPTION OF THE DRAWINGS

FIG. 2 depicts examples of threshold matrixes;

FIG. 3 depicts additional examples of threshold matrixes;

FIG. 5 is an example of an error matrix error-sum calculating unit;

FIG. 6 is another example of the error matrix;

FIG. 12 is a schematic drawing of a threshold matrix with part of values of the threshold matrixes depicted in FIG. 2 being changed;

FIG. 13 is a schematic drawing of one example of threshold matrixes according to another example;

FIG. 14 is a schematic drawing of another example of the threshold matrixes according to the first embodiment;

FIG. 20 is a schematic drawing of one example of a threshold matrix for use in an image processing apparatus according to a fourth embodiment;

FIG. 21 is a schematic drawing of one example of another threshold matrix for use in an image processing apparatus according to the fourth embodiment;

FIG. 23 is a schematic drawing of one example of a dither threshold table according to a conventional example.

DETAILED DESCRIPTION OF THE PREFERRED EMBODIMENTS

Figure 1:
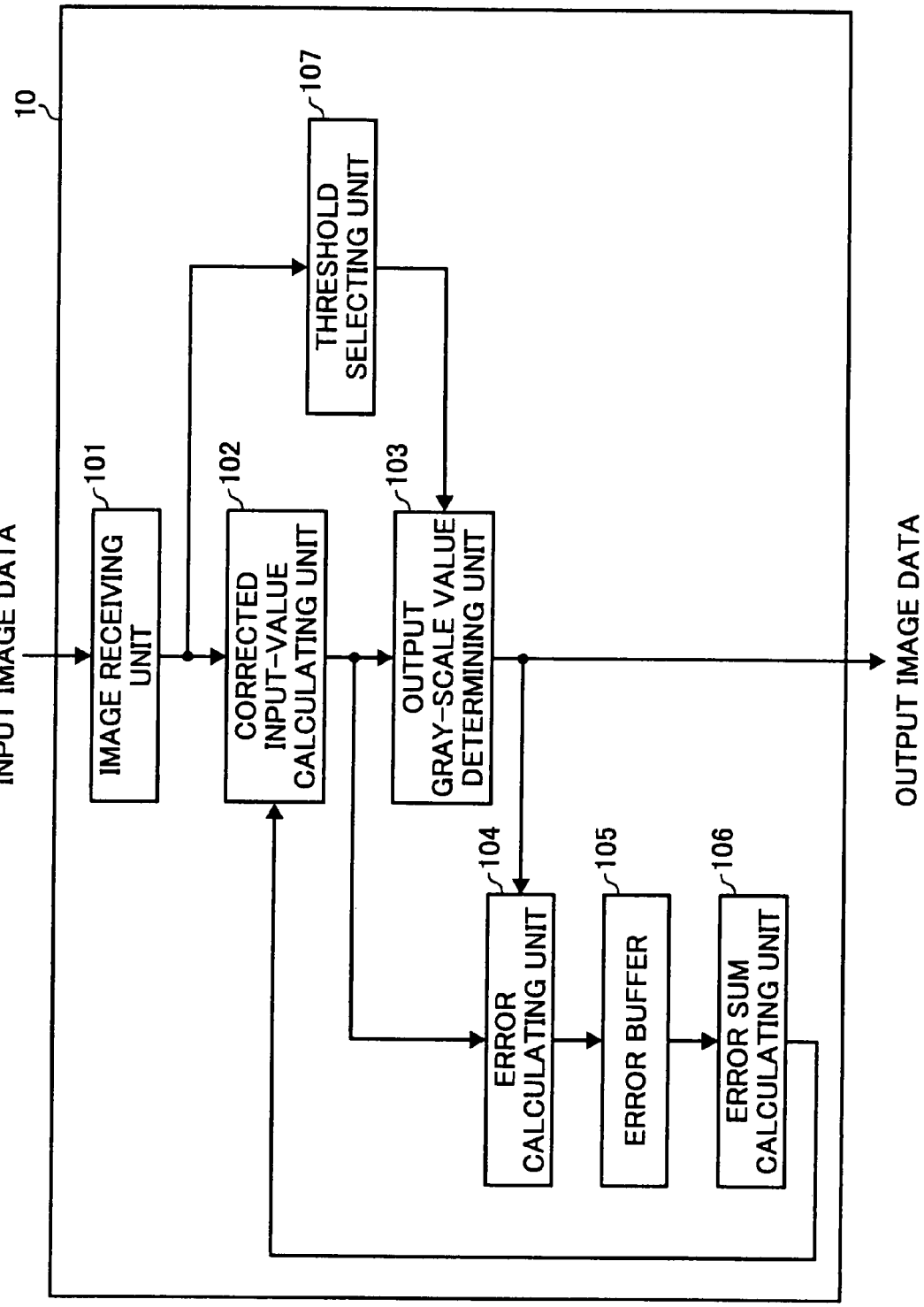
FIG. 1 is a functional block diagram of an image processing apparatus according to a first embodiment.

Embodiments of the present invention at least partially solve the problems in the conventional technology.

According to one embodiment of the present invention, an image processing apparatus that receives image information and determines an output gray-scale value of the image information, includes a corrected input-value calculating unit that calculates a corrected input value by assigning a predetermined weight to an error value near a target pixel of the image information and adding the error value to an input gray-scale value; a threshold selecting unit that selects a threshold based on an input gray-scale value of at least one of the target pixel of the image information and a pixel near the target pixel; an output gray-scale value determining unit that determines an output gray-scale value based on the corrected input value calculated by the corrected input-value calculating unit and the threshold selected by the threshold selecting unit; and an error calculating unit that calculates a difference between the output gray-scale value determined by the output gray-scale value determining unit and the corrected input value as an error value, and transmits the calculated error value to the corrected input-value calculating unit. When a degree of flexibility is defined as representing a degree of the number of pixels that can take different output values as a result of threshold processing on an input image formed only with a predetermined gray-scale value, the threshold selecting unit selects a threshold from at least two types of threshold tables with same period and different degrees of flexibility based on the input gray-scale value of at least one of the target pixel and the pixel near the target pixel.

According to another embodiment of the present invention, an image processing apparatus that receives image information and determines an output gray-scale value of the image information includes a corrected input-value calculating unit that calculates a corrected input value by assigning a predetermined weight to an error value near a target pixel of the image information and adding the error value to an input gray-scale value; a threshold selecting unit that selects a threshold based on an input gray-scale value of at least one of the target pixel of the image information and a pixel near the target pixel; an output gray-scale value determining unit that determines an output gray-scale value based on the corrected input value calculated by the corrected input-value calculating unit and the thresholds selected by the threshold selecting unit; and an error calculating unit that calculates a difference between the output gray-scale value determined by the output gray-scale value determining unit and the corrected input value as an error value, and transmits the calculated error value to the corrected input-value calculating unit. The output gray-scale value determining unit determines an output gray-scale value while using an approximately constant threshold irrespectively of a pixel position and, for a specific pixel position, switching between a first process of determining one specific type of output gray-scale value and a second process of determining an output gray-scale value by using a threshold selected based on the pixel position.

According to still another embodiment of the present invention, an image processing method in an image processing apparatus includes first calculating including calculating a corrected input value by assigning a predetermined weight to an error value near a target pixel of received image information and adding the error value to an input gray-scale value; selecting a threshold based on an input gray-scale value of at least one of the target pixel of the image information and a pixel near the target pixel; determining an output gray-scale value based on the corrected input value calculated at the calculating and the threshold selected at the selecting; and second calculating including calculating a difference between the output gray-scale value determined at the determining and the corrected input value as an error value, wherein the error value is used at the first calculating. When a degree of flexibility is defined as representing a degree of the number of pixels that can take different output values as a result of threshold processing on an input image formed only with a predetermined gray-scale value, the selecting includes selecting a threshold from at least two types of threshold tables with same period and different degrees of flexibility based on the input gray-scale value of at least one of the target pixel and the pixel near the target pixel.

According to still another aspect of the present invention, a computer-readable recording medium stores therein a computer program that causes a computer to perform the above image processing method.

The above and other objects, features, advantages and technical and industrial significance of this invention will be better understood by reading the following detailed description of presently preferred embodiments of the invention, when considered in connection with the accompanying drawings.

Exemplary embodiments of the present invention will be described below with reference to the accompanying drawings.

FIG. 1 is a functional block diagram of an image processing apparatus 10 according to a first embodiment. An image processing apparatus 10 includes an image receiving unit 101, a corrected input-value calculating unit 102, an output gray-scale value determining unit 103, an error calculating unit 104, an error buffer 105, an error-sum calculating unit 106, and a threshold selecting unit 107. This image processing apparatus 10 can be employed in a color copier to perform image processing for color image formation.

The corrected input-value calculating unit 102 calculates a corrected input value by weighting and adding an error value near a target pixel of image information received via the image receiving unit 101 to an input gray-scale value. The threshold selecting unit 107 selects a threshold based on the input gray-scale value of the target pixel. The output gray-scale value determining unit 103 determines an output gray-scale value based on the calculated corrected input value and the selected threshold. The error calculating unit 104 calculates a difference between the output gray-scale value and the corrected input value as an error value, and transmits the calculated error value to the corrected input-value calculating unit. The threshold selecting unit 107 determines a threshold table for use from out of a plurality of threshold tables with different degrees of flexibility based on the input gray-scale value of target pixel and, by using the threshold table, determines a threshold based on the input gray-scale value or based on the input gray-scale value and a pixel position. Here, the degree of flexibility is defined as representing a degree of the number of pixels that can take different output values as a result of threshold processing on an input image formed only with a predetermined gray-scale value, and its calculating method will be explained further below. Also, a threshold table is a threshold matrix depicted in FIG. 2 or 3, which will be explained further below, or a table depicted in FIG. 4B in which input gray-scale values and thresholds for use are associated with one another.

With this configuration, the image processing apparatus according to the first embodiment can suppress the occurrence of roughness, and also can suppress distortion in switching at the time of selecting a threshold, thereby performing image processing with high image quality.

The image receiving unit 101 performs a density correction process and a frequency correction process on image data read by a scanner in, for example, a color copier, performs a gray-tone process on an input image converted to images for cyan, magenta, yellow, and black (CMYK) printings, and then sequentially sends input gray-scale values for the respective pixels to the following process. In the following explanation, it is assumed that both of an input gray-scale value and an output gray-scale value take integer values of 0 to 255 represented by 8 bits, and as the value is larger, the density is higher.

Figures 4A, 4B:
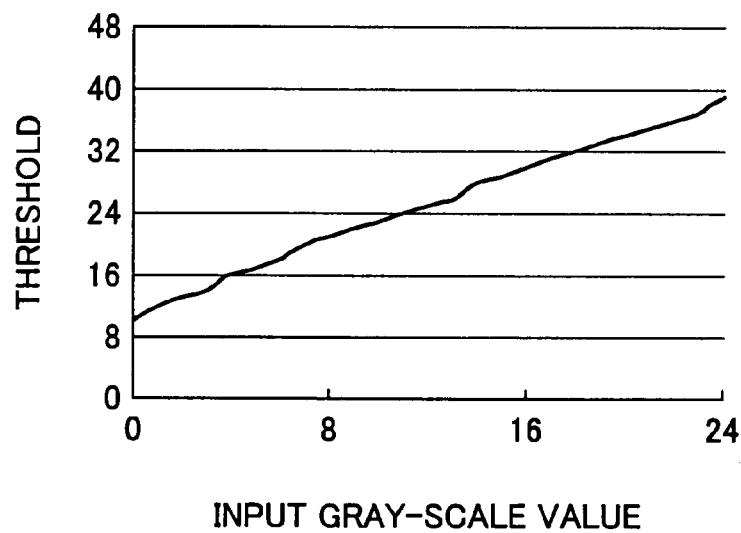
FIG. 4A is a graph of thresholds versus input gray-scale values.
FIG. 4B depicts input gray-scale values for various thresholds.

FIG. 2 is a schematic drawing of one example of threshold matrixes for use in the image processing apparatus. FIG. 3 is a schematic drawing of one example of other threshold matrixes for use in the image processing apparatus. FIG. 4A is a graph representing one example of thresholds for use for input gray-scale values in the image processing apparatus. FIG. 4B is a relation table tabulated from the graph of FIG. 4A, containing thresholds for use with respect to input gray-scale values.

The threshold selecting unit 107 determines a threshold table for use from out of a plurality of threshold tables with different degrees of flexibility based on the input gray-scale value of target pixel and, using the threshold table, further selects a threshold based on an input gray-scale value or a pixel position.

(1) When the input gray-scale value is more than 22, the threshold matrixes depicted in FIG. 2 are selected, and a threshold is selected from the pixel position.

(2) When the input gray-scale value is more than 18 and equal to or less than 22, the threshold matrixes depicted in FIG. 3 are selected, and a threshold is selected from the pixel position.

(3) When the input gray-scale value is less than 18, the threshold matrixes depicted in FIG. 4B are selected, and a threshold is selected from the pixel position. The selected threshold is transmitted to the output gray-scale-value determining unit 103. Here, the threshold matrixes in FIGS. 2 and 3 have the same period.

Having the same period means that a relation in which a threshold at an arbitrary pixel position is equal to a threshold at a pixel position that is a predetermined positive distance away from the arbitrary pixel position in a predetermined direction is satisfied when the distance between these pixel positions are such that the latter pixel position is two pixels away rightward from the arbitrary pixel position and two pixels away downward therefrom, and this relation is not satisfied with a distance shorter than the distance.

Here, a method of determining a threshold using the pixel matrixes is explained. The position corresponding to a target pixel on a threshold matrix is determined based on the position where the target pixel is located in the threshold matrixes when the threshold matrixes are repeatedly laid out like tiles on the output image.

That is, when the size of a threshold matrix is w pixels in width and h pixels in height, for a target pixel at a width X and a height Y in output image coordinates, a threshold at a position at (Xmodw) on a horizontal axis and (Ymodh) on a vertical axis on threshold matrix coordinates. Here, mod is a remainder operator, and (Xmodw) indicates a remainder when X is divided by w. For example, in the threshold matrixes in FIG. 2, w=h=4. Therefore, for example, for a pixel with (X,Y)=(9, 6) on output image coordinates, a threshold at a position of (x, y)=(1, 2) is used. In this case, a threshold A, a threshold B, and a threshold C for determining whether dots corresponding to output gray-scale values of 85, 170, and 255 are 176, 192, and 207 from a threshold matrix 201A, a threshold matrix 202B, and a threshold matrix 203C, respectively.

Also, a method of determining a threshold from the relation between the input gray-scale values and the thresholds depicted in the table of FIG. 4B is explained. For example, when the input gray-scale value of a target pixel is 18, from the relation depicted in the table of FIG. 4B, a threshold A is 32, the threshold B is 32, and a threshold C is 255.

The corrected input-value calculating unit 102 calculates a corrected input value, which is a sum of the pixel value of the target pixel in the image data received from the image receiving unit 101 and a quantization error sum at peripheral pixels from the error-sum calculating unit 106.

FIG. 5 is a schematic drawing of one example of an error matrix for use by the error-sum calculating unit. The error-sum calculating unit 106 uses the error matrix depicted in FIG. 5 to calculate a quantization error sum at peripheral pixels. Here, in FIG. 5, a position marked by x indicates the target pixel. For example, when the quantization error value of a pixel straight above the target pixel by one line is 32, the value corresponding to that pixel on the error matrix is 4/32, and therefore the quantization error associated with the target pixel from that pixel is the product of these quantization error values, that is, 4. In this manner, quantization errors at a total of seventeen pixels, that is, seven pixels that are two lines above one target pixel, seven pixels that are one line above the target pixel, and three pixels that are on the same line of the target pixel, are read from the error buffer 105, and a product-sum operation is performed on each quantization error with the error matrix, thereby calculating a quantization error sum associated with the target pixel. The quantization error sum is then sent to the corrected input-value calculating unit 102. The error matrix depicted in FIG. 5 is designed so that 1 is obtained when all elements are summed. This is to reflect the occurring quantization error onto the peripheral pixels without excess or deficiency.

FIG. 6 is a schematic drawing of another example of the error matrix. Here, as an error matrix for calculating a quantization error sum, the error matrix depicted in FIG. 6 may be used in place of the one depicted in FIG. 5. In the error matrix of FIG. 6, each value is obtained by multiplying each value in the matrix of FIG. 5 by 32. For example, when the quantization error of a pixel straight above the target pixel by one line is 32, the value corresponding to that pixel in the error matrix is 4. Therefore, the quantization error associated with the target pixel from that pixel is assumed to be 128, which is the product of these quantization errors. In this manner, quantization errors at a total of seventeen pixels, that is, at seven pixels that are two lines above one target pixel, seven pixels that are one line above the target pixel, and three pixels that are on the same line of the target pixel are read from the error buffer 105, an operation is performed on each quantization error with the error matrix, and then a quantization error sum obtained through the operation is divided by 32. By taking such a method, a quantization error sum associated with the target pixel can be calculated with a high-speed integer operation or shift operation.

Figure 7:
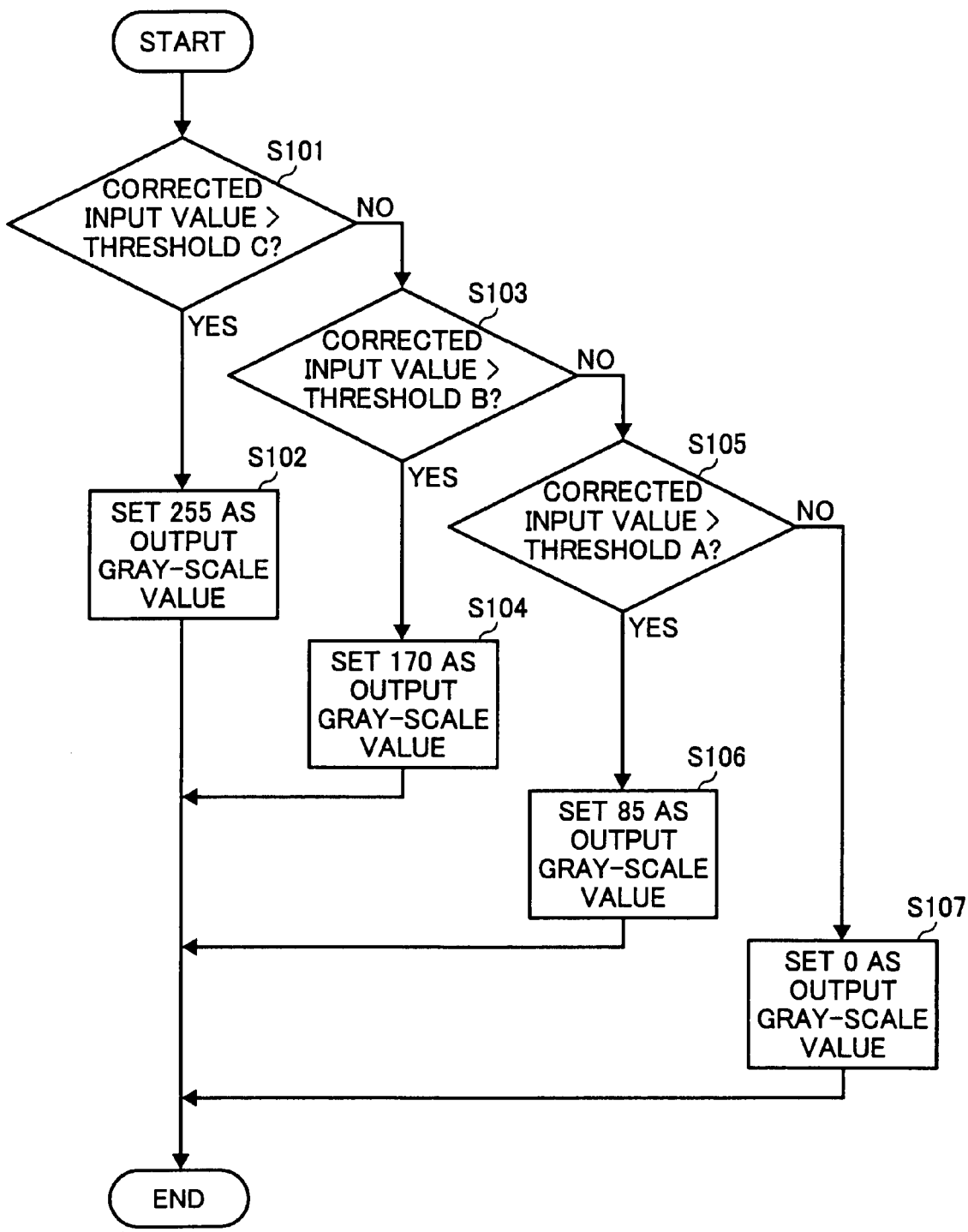
FIG. 7 is a flowchart of a process procedure for determining an output gray-scale value.

FIG. 7 is a flowchart illustrating a procedure of determining an output gray-scale value by the output gray-scale value determining unit. The output gray-scale value determining unit 103 receives the thresholds from the threshold selecting unit 107, receives a corrected input value from the corrected input-value calculating unit 102, and compares each threshold and the corrected input value to determine an output gray-scale value. In the following explanation of the procedure, thresholds are denoted as thresholds A, B, and C, which means that threshold matrixes corresponding to 201A, 202B, and 203C are used when the threshold matrixes depicted in FIG. 2 are used.

First, the output gray-scale value determining unit 103 compares in magnitude between the corrected input value received from the corrected input-value calculating unit 102 and the threshold C received from the threshold selecting unit 107 (step S101). Here, when the corrected input value is more than the threshold C ("Yes" at step S101), 255 is set as the output gray-scale value (step S102).

On the other hand, upon determining that the corrected input value is equal to or less than the threshold C ("No" at step S101), the output gray-scale value determining unit 103 compares in magnitude between the corrected input value and the threshold B received from the threshold selecting unit 107 (step S103). Here, when the corrected input value is more than the threshold B ("Yes" at step S103), 170 is set as the output gray-scale value (step S104).

On the other hand, upon determining that the corrected input value is equal to or less than the threshold B ("No" at step S103), the output gray-scale value determining unit 103 compares in magnitude between the corrected input value and the threshold A received from the threshold selecting unit 107 (step S105).

Here, when the output gray-scale value determining unit 103 determines that the corrected input value is more than the threshold A ("Yes" at step S105), 85 is set as the output gray-scale value (step S106). On the other hand, when it is determined that the corrected input value is equal to or less than the threshold A ("No" at step S105), 0 is set as the output gray-scale value (step S107).

The error calculating unit 104 takes a value obtained by subtracting the output gray-scale value from the corrected input value at the target pixel as a quantization error, and stores the quantization error in the error buffer 105. In this manner, the output gray-scale value is found.

The output gray-scale value output from the output gray-scale value determining unit 103 then is phase-shifted by a phase controlling unit not shown based on the relation in magnitude between output gray-scale values forward and backward in a main scanning direction, in order to be shifted to a larger value.

Figures 8, 9:
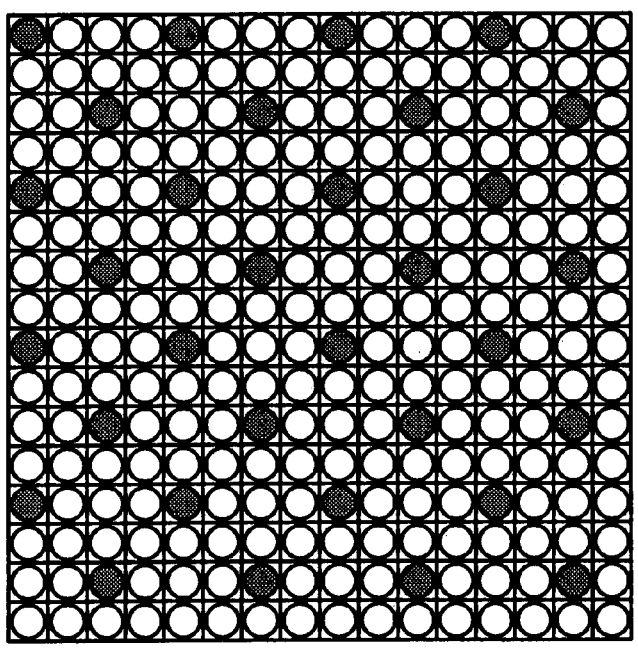
FIG. 8 is a schematic drawing of one example of a matrix representing an order of developing dots when the error diffusion matrix of FIG. 5 is applied to the threshold matrixes depicted in FIG. 2.
FIG. 9 is a schematic drawing of one example of a dot screen.

FIG. 8 is a schematic drawing of one example of a matrix representing an order of developing dots when the error diffusion matrix of FIG. 5 is applied to the threshold matrixes depicted in FIG. 2. Here, the threshold matrixes depicted in FIG. 2 are further explained in detail. The threshold matrixes depicted in FIG. 2 are designed so that, when the error diffusion matrix of FIG. 5 is applied, dots are grown in the order depicted in FIG. 8, a dot with an isolated gray-scale value less than 170 does not occurs, and an average quantization error is close to 0.

The isolated dot means a dot to which no dots other than those with a gray-scale value of 0 are adjacent in vertical and horizontal directions. However, when the gray-scale value of that pixel is 0, that dot is not called an isolated dot. The problem is that an isolated low-density dot is difficult to stably reproduce its density. To solve this problem, in the first embodiment, the occurrence of an isolated dot with a gray-scale value less than 170 is suppressed, thereby aiming at stable density reproduction.

Here, the average quantization error is a value obtained by averaging the quantization errors occurring at the respective pixel positions, that is, values each obtained by subtracting the output gray-scale value from the corrected input value.

Such threshold matrixes can be designed by using the technology devised by the inventor. That is, for example, in an image processing apparatus of calculating a corrected input value by assigning a predetermined weight to an error value near a target pixel position and adding the error value to an input gray-scale value, determining an output gray-scale value based on the calculated corrected input value of a target pixel position and a predetermined threshold corresponding to the target pixel position, and calculating a difference between the determined output gray-scale value and the corrected input value as an error value, the predetermine threshold is set so that a rate of change of an average value of errors calculated with respect to changes in the input gray-scale value falls within a predetermined range. In this manner, by designing the threshold set so that the rate of change of the average value of the error falls within the predetermined range, stable density reproduction in halftone processing can be aimed at.

Now, the threshold matrix 201A, the threshold matrix 202B, and the threshold matrix 203C are those containing thresholds that determine whether to output a dot corresponding to an output gray-scale value of 85, a dot corresponding to an output gray-scale value of 170, and a dot corresponding to an output gray-scale value of 255, respectively, and are those for quad-value output representing a dot screen with approximately 212 lines and 45 degrees in output resolution of 600 dots per inch. That is, the output gray-scale value is determined from out of four types of output gray-scale values, that is, 0, 85, 170, and 225.

(1.2. Degree of Flexibility)

When the threshold matrixes depicted in FIG. 2 are used, for an input image with a low gray-scale value, for example, for an input image formed only with a gray-scale value of 18, a gray-scale value of 0 or 170 is generally output at pixel positions corresponding to $(x, y)=(1, 1)$ and $(3, 3)$, whilst only a gray-scale value of 0 is output at other pixel positions. An output gray-scale value is selected from out of a plurality of values at two pixels per sixteen pixels in general, and the output gray-scale value is fixed to a specific value, 0 herein, at the other fourteen pixels. Therefore, the degree of flexibility of the threshold matrixes in FIG. 2 is represented as 2/16.

Also, in the manner explained above, when the threshold matrixes are used, a pixel point that can take a plurality of pixel values is referred to as a flexible point.

Next, the threshold matrixes depicted in FIG. 3 is explained. As with the threshold matrixes depicted in FIG. 2, a threshold matrix 301A, a threshold matrix 302B, and a threshold matrix 303C in FIG. 3 contain thresholds that determine whether to output a dot corresponding to an output gray-scale value of 85, a dot corresponding to an output gray-scale value of 170, and a dot corresponding to an output gray-scale value of 255, respectively.

By using the threshold matrixes depicted in FIG. 3, for an input image with a relatively low gray-scale value, for example, for an input image formed only with a gray-scale value of 24, the output image is represented by either a gray-scale value of 0 or 170. Also, the gray-scale value is generally 0 or 170 at pixel positions corresponding to (x, y)=(1, 0), (0, 1), (1, 1), (3, 2), (2, 3), and (3, 3), whilst only a gray-scale value of 0 is output at other pixel positions. That is, when an image with a low gray-scale value is input, a dot with a gray-scale value of 170 occurs at pixel positions where a dot with a gray-scale value of 170 occurs when the thresholds based on FIG. 3 are used, and their peripheral pixel positions.

Also, in the threshold matrixes depicted in FIG. 3, the output gray-scale value is selected from out of a plurality of values generally for six pixels per sixteen pixels. Therefore, the threshold matrixes depicted in FIG. 3 are represented as having a degree of flexibility of 6/16. Also in this example, the number of flexible pixel points is six.

In this manner, for an input image with a predetermined constant density value, the degree of flexibility of the output gray-scale value that can be taken differs depending on the set threshold. In this manner, when the number of output gray-scale values that can be taken for the input image with a constant density value is large, it is defined that the threshold has a large degree of flexibility.

When the threshold matrixes depicted in FIG. 3 are used, the degree of flexibility of pixel-value distribution of the output image is increased, and dots with the gray-scale value of 170 are easy to be disposed as being diffused.

Here, when the threshold matrixes depicted in FIG. 3 are used, the output gray-scale value can take 255 at any pixel position. This is not the case, however, when the input gray-scale value of the target pixel is low, and the probability that the output gray-scale value takes either 0 or 170 is high at any pixel position.

Also, when the threshold matrixes depicted in FIG. 3 are used, as evident from the procedure of FIG. 7, when the input gray-scale value is low, a dot with an isolated gray-scale value less than 170 does not occur.

When a distortion at a switching portion with respect to a region using the thresholds depicted in FIG. 2 is desired to be suppressed, the threshold matrixes depicted in FIG. 3 can be designed so that an average quantization error is close to 0 for an input image with its input gray-scale value being formed only with a gray-scale value that is close to 22. This is to prevent the average quantization error from being significantly changed near the gray-scale value for switching of a threshold table.

When a distortion at a switching portion with respect to a region using the thresholds depicted in FIG. 4B is desired to be suppressed, the average quantization error is designed to be close to 0 for an input image formed only of a gray-scale value near an input gray-scale value of 18. This is to prevent the average quantization error from being significantly changed near the gray-scale value for switching of a threshold table. That is, this is to suppress the occurrence of a deterioration in image quality, that is, a distortion, at a boundary portion of these regions due to a significant change in average quantization error.

Next, a relation between the input gray-scale values and the thresholds depicted in FIG. 4B is explained. Here, FIG. 4A represents the relation between the input gray-scale values and the thresholds of FIG. 4B as a graph. Also, a method of designing the relation between the input gray-scale values of the target pixel and the thresholds of FIG. 4B will be explained further below.

Here, when the input gray-scale value of the target pixel is 18, 32 is obtained for a threshold A and a threshold B, and 255 is obtained for a threshold C from FIG. 4B. At this time, when the corrected input value of the target pixel is more than the threshold C of 255, the output gray-scale value is 255. Otherwise, when the corrected input value is more than the thresholds A and B of 32, the output gray-scale value is 170. Otherwise, the output gray-scale value is 0.

However, when the input gray-scale value of the target pixel is low, the possibility that the corrected input value of the target pixel is more than 255 is low. That is, the probability that the output gray-scale value is 255 is low. Also, a dot less than the isolated gray-scale value of 170 does not occur even when the thresholds based on FIG. 4B are used.

Here, when thresholds based on FIG. 4B are used for processing, the range of pixel position where the output gray-scale value of 170 occurs is wider and dots tend to be laid out as being more dispersed, compared with the case where the thresholds depicted in FIG. 2 or 3 are used.

Here, the configuration may be such that blue noise, which is random noise without having low-frequency components in space, added to the thresholds based on FIG. 4B.

Meanwhile, in the process using the thresholds depicted in FIG. 2, a dot screen having a desired number of lines can be formed for an image with a high input gray-scale value, thereby achieving low graininess. For an image with a low input gray-scale value, however, the dots do not satisfy a required number of dots for forming a desired number of lines, thereby increasing graininess. This may be because the latter case causes an image containing many low-frequency components and is viewed from human eyes as containing roughness.

FIG. 9 is a schematic drawing of one example of the dot screen. Here, a dot screen with the isolated minimum dot having a gray-scale value equal to or more than 170 and with approximately 212 lines and 45 degrees in output resolution of 600 dots per inch is filled with dots two pixels per sixteen pixels with a gray-scale value of 170 and dots of fourteen pixels with a gray-scale value of 0, as depicted in FIG. 9. An average gray-scale value at this time is 21.25 from Equation 1.

$$\{170 \times 2 + 0 \times 14\}/16 = 21.25 \qquad \text{(Equation 1)}$$

That is, this screen cannot be created for an input image with an average gray-scale value less than 21.25. For such an input image, a process of evenly dispersing dots will often result in less roughness and graininess.

Therefore, the thresholds based on FIG. 2 are used for processing for a region with a high input gray-scale value, whilst the thresholds based on FIG. 4B, for example, where dots are dispersed are used for processing for a region with a low input-gray-scale value. With this, an image with less graininess can be obtained for various input gray-scale values.

For a region with a gray-scale value between regions with low and high values, the thresholds depicted in FIG. 3 where dots are moderately dispersed are used for processing. When the processes with significantly different dot dispersion are switched, such as the case of the thresholds based on FIGS. 2 and 4, a distortion tends to occur at a process switching portion of a gradation image with a smooth gray-scale change, for example. By using thresholds with moderately-dispersed dots between the regions with low and high values, such a distortion can be reduced.

Furthermore, when the thresholds depicted in FIG. 3 are used, a dot with a gray-scale value of 170 occurs only at a pixel position where a dot with a gray-scale value of 170 occurs when the thresholds depicted in FIG. 2 are used and its peripheral pixel position. With this, a distortion at the process switching portion between the regions with low and high values can be reduced.

Which threshold is used for which input gray-scale value is determined so that an image output with a threshold value has less roughness and a distortion at the process switching portion is inconspicuous. Also at the same time, the threshold matrixes of FIG. 3 are determined so that a distortion at the process switching portion is inconspicuous.

Figure 10:
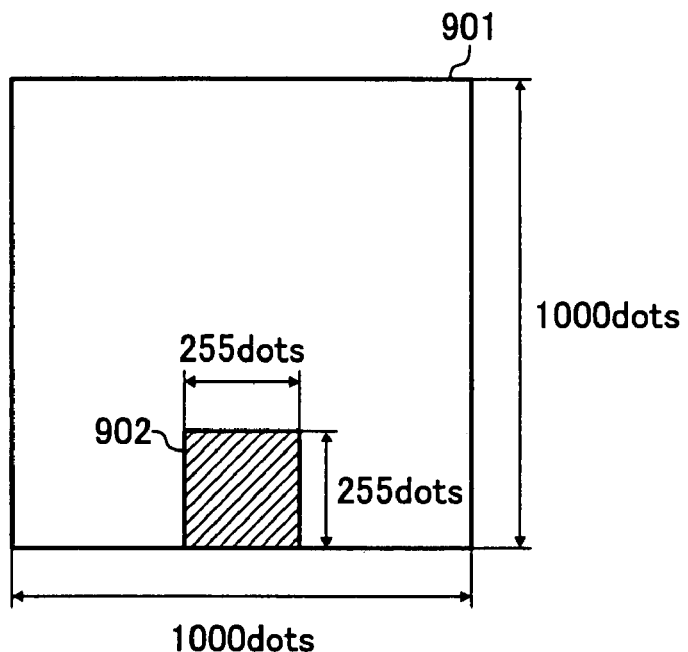
FIG. 10 is a drawing illustrating a method of designing a relation between the input gray-scale value of a target pixel and the thresholds depicted in FIG. 4B.

FIG. 10 is a drawing illustrating the method of designing a relation between the input gray-scale values of a target pixel and the thresholds depicted in FIG. 4B. First, to find a threshold for d, which is taken as an input gray-scale value, a solid image with a sufficiently-large input gray-scale value of d is prepared as an input image. Here, an image 901 with 1000 dots square of FIG. 10 is taken as the input image Next, provisional thresholds are initially given. It is assumed that, with the thresholds A and B being a provisional value t, the value of the threshold C is fixed to 255.

Next, a halftone process is performed on the prepared solid image by using these provisional thresholds, and an average quantization error occurring in a predetermined range is found. Here, an average quantization error in a region 902 with 255 dots square depicted in FIG. 10 is found.

With the provisional threshold t being changed in increments of 1 from 0 to 255, the operation explained above is repeated, thereby obtaining a threshold for the input gray-scale value d with the average quantization error being most close to 0.

Figure 11:
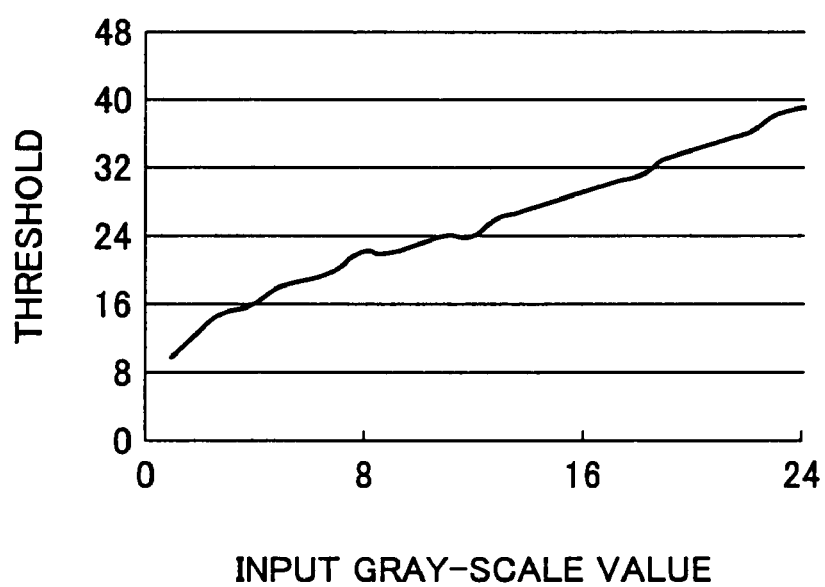
FIG. 11 is a graph representing one example of thresholds obtained so that an average quantization error is close to 0.

FIG. 11 depicts thresholds obtained so that the average quantization error is close to 0. In this manner, by repeating the operation explained above with the input gray-scale value d being changed, a relation of thresholds with the average quantization error corresponding to the input gray-scale values being most close to 0 is obtained, as depicted FIG. 11. A curve representing the relation between the input gray-scale values and the thresholds depicted in FIG. 11 are corrected in order to be smoothed and to satisfy a relation represented by the following Equation 2, thereby obtaining the relation depicted in FIG. 4A.

$$t(d+1) > t(d) \quad \text{(Equation 2)}$$

where d is an input gray-scale value, and t(d) is a threshold for the input gray-scale value d.

In the first embodiment, the configuration is such that three types of thresholds are determined from those in FIGS. 2, 3, and 4B based on the input gray-scale value. The configuration based on the present invention is not restricted to such a configuration, but may be such that, for example, a threshold may be determined from either one of FIGS. 2 and 3.

FIG. 12 is a schematic drawing of a threshold matrix with part of values of the threshold matrixes depicted in FIG. 2 being changed. The configuration may be such that the threshold matrixes depicted in FIG. 12 are used in place of the threshold matrixes of FIG. 3.

FIG. 13 depicts threshold matrixes according to another example. Here, the configuration can be such that the threshold matrixes as depicted in FIG. 13 are used in place of the threshold matrixes depicted in FIG. 3. That is, in the threshold matrixes depicted in FIG. 13, (x, y)=(1, 0), (0, 1), (1, 1), (3, 2), (2, 3), and (3, 3) of the threshold matrixes do not have to have the same value, but can be independently set, thereby controlling the probability of occurrence of a dot with a gray-scale value of 170 at the corresponding pixel positions. For example, the thresholds can be set so that the probability of occurrence of a dot at each pixel position is the same. Also, the probability of occurrence of a dot at pixel positions of (x, y)=(1, 1) and (3, 3), which is increased, thereby suppressing a distortion at a boundary portion of switching thresholds depicted in FIGS. 2 and 3.

FIG. 14 is a schematic drawing of another example of the threshold matrixes according to the first embodiment. In the first embodiment, the configuration is such that the thresholds are switched in region with a relatively low input gray-scale value. This is not meant to be restrictive, and the configuration may be such that threshold matrixes as depicted in FIG. 14 are used in a region with a relatively high input gray-scale value. This is to increase dispersion and suppress the occurrence of roughness by using flexible threshold matrixes in a region with a relatively high input gray-scale value.

When the thresholds of FIG. 2 are used for processing on an image with high input gray-scale value, for example, an input image formed only with a gray-scale value of 246, the output gray-scale value is 170 or 255 at pixel positions corresponding to (x, y)=(2, 0) and (0, 2) in general, whilst only the output gray-scale value of 255 occurs at other pixel positions.

On the other hand, by using the threshold matrixes depicted in FIG. 14, the output gray-scale value is 170 or 255 at pixel positions corresponding to (x, y)=(2, 0), (3, 0), (2, 1), (0, 2), (1, 2), and (0, 3) in general, whilst only the output gray-scale value of 255 occurs at other pixel positions.

From the above, when the input gray-scale value of the target pixel is more than 238, for example, the threshold matrixes depicted in FIG. 14 are used, thereby increasing the degree of flexibility of distribution of pixel values of the output image in a region with a relatively high input gray-scale value, laying out dots with the gray-scale value of 170 in a dispersed manner, and mitigating graininess.

(1.3. Image Processing Procedure)

Figure 15:
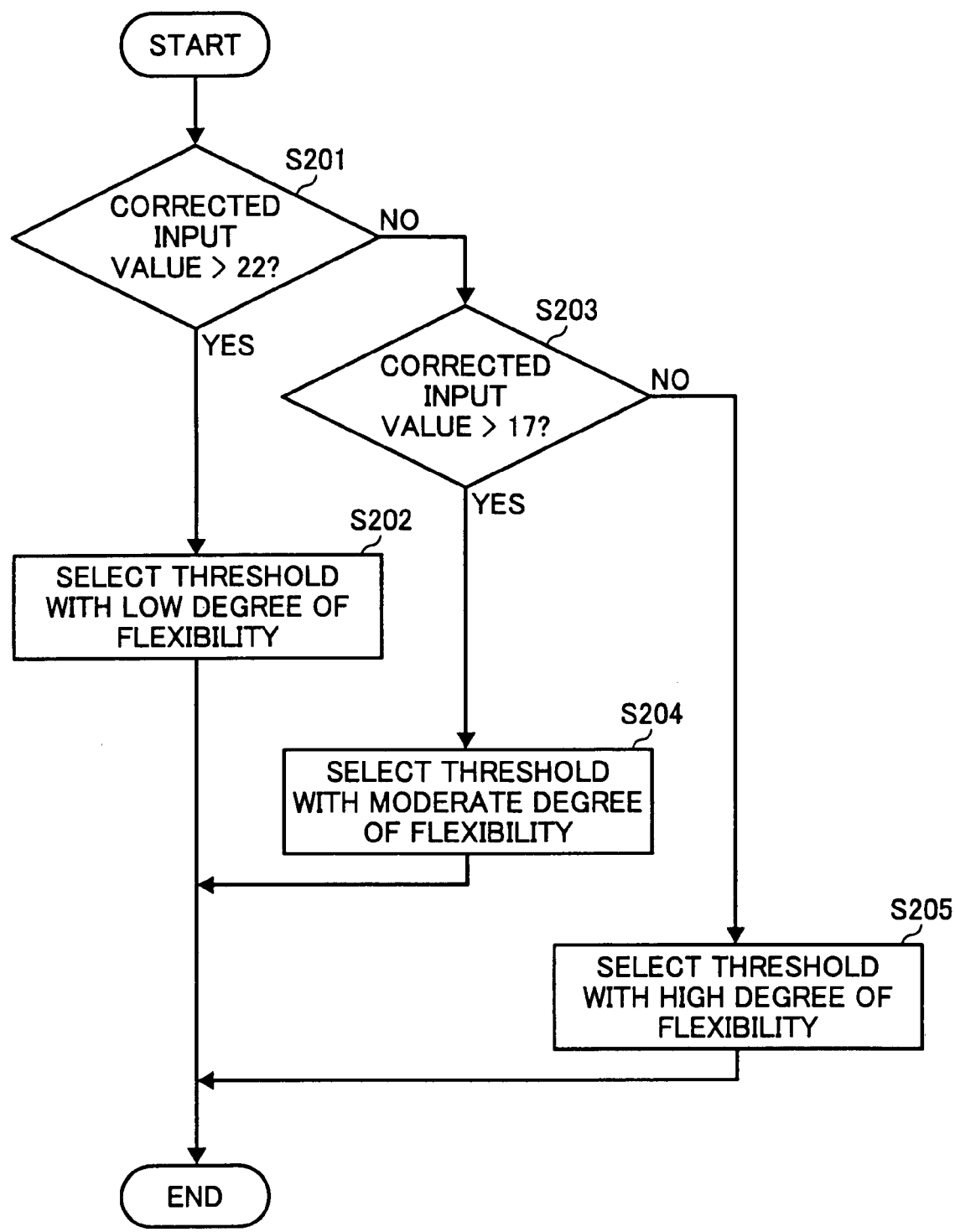
FIG. 15 is a flowchart of a process procedure for selecting a threshold.

FIG. 15 is a drawing illustrating a procedure of selecting a threshold by a threshold selecting unit in image processing according to the first embodiment. The threshold selecting unit 107 determines whether the input gray-scale value of the target pixel is more than 22 (step S201). When the input gray-scale value is determined as being more than 22 ("Yes" at step S201), a threshold with a low degree of flexibility is selected. Here, as a threshold with a low degree of flexibility, a threshold is selected based on the threshold matrixes depicted in FIG. 2, for example (step S202). Then, based on the threshold value, the output gray-scale value determining unit 103 determines an output gray-scale value.

On the other hand, when the input gray-scale value is determined as being equal to or less than 22 ("No" at step S201), the threshold selecting unit 107 determines whether the input gray-scale value of the target pixel is more than 17 (step S203). When the input gray-scale value is determined as being more than 17 ("Yes" at step S203), a threshold with a moderate degree of flexibility is selected. Here, for example, a threshold is selected based on the threshold matrixes depicted in FIG. 3, for example (step S204). Then, based on the threshold value, the output gray-scale value determining unit 103 determines an output gray-scale value.

On the other hand, when the input gray-scale value is determined in step S203 as being equal to or less than 22 ("No" at step S203), the threshold selecting unit 107 selects a threshold with a high degree of flexibility. Here, for example, a threshold is selected based on the table in FIG. 4B, (step S205). Then, based on the threshold value, the output gray-scale value determining unit 103 determines an output gray-scale value.

In this manner, the threshold selecting unit 107 determines a threshold table for use based on the input gray-scale value from out of threshold tables with different degrees of flexibility to select a threshold.

Figure 16:
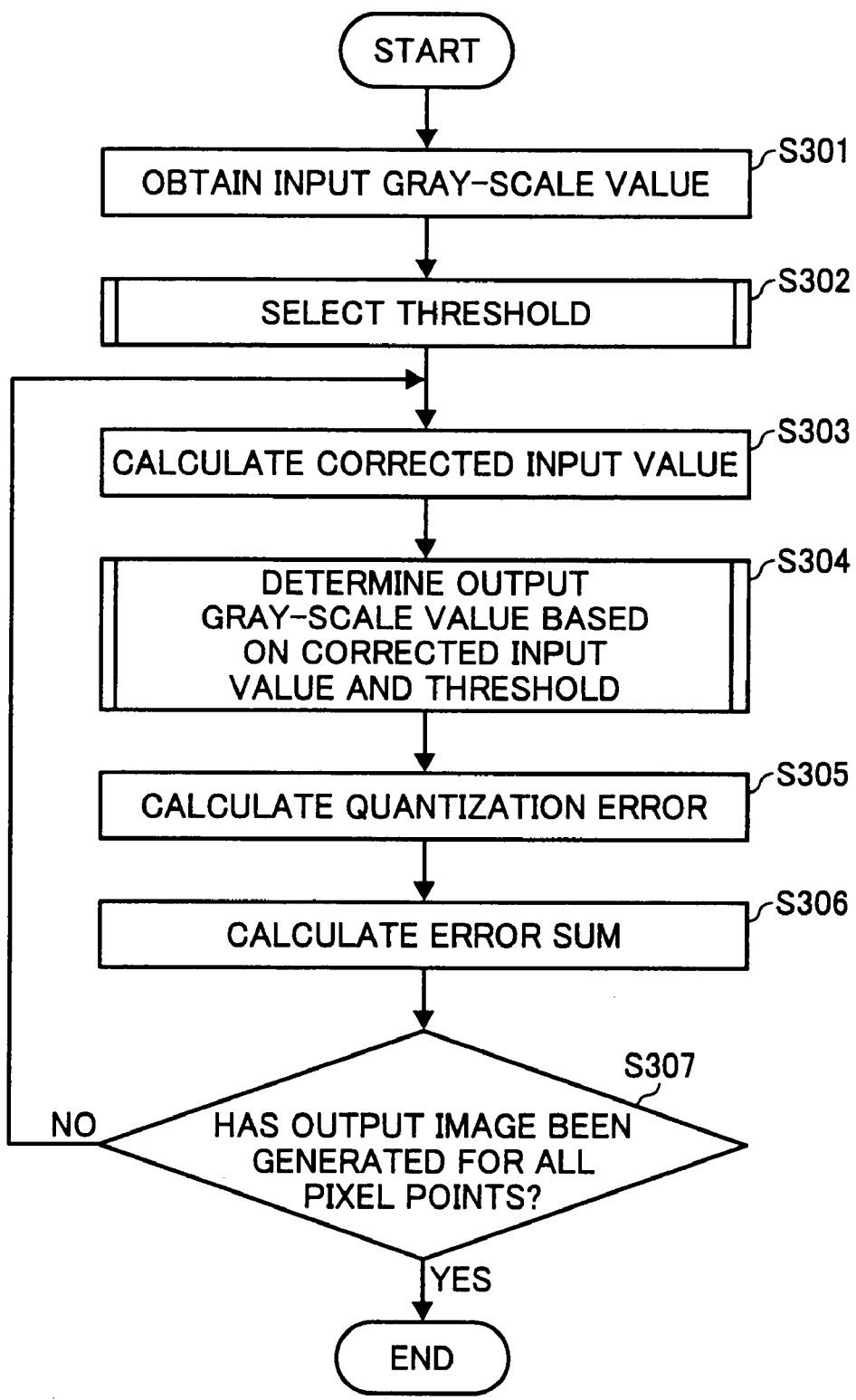
FIG. 16 is a flowchart of an image processing procedure according to the first embodiment.

FIG. 16 is a flowchart illustrating an image processing procedure according to the first embodiment. The threshold selecting unit 107 obtains an input gray-scale value of the target pixel in sequence (step S301). The threshold selecting unit 107 then selects a threshold for the input gray-scale value. This threshold selection has already been explained with reference to the flowchart of FIG. 15 (step S302).

The corrected input-value calculating unit 102 then calculates a corrected input value obtained by adding an error sum received from the error-sum calculating unit 106 to the input gray-scale value. That is, the input gray-scale value and the quantization error sum calculated by using the threshold matrix of FIG. 5 from the peripheral quantized error are added together for finding a corrected input value (step S303).

The output gray-scale value determining unit 103 then performs a threshold process for quantization on the corrected input value calculated by the corrected input-value calculating unit 102 with the threshold selected by the threshold selecting unit 107, thereby determining an output gray-scale value. The procedure of this step S304 has already been explained with reference to the flowchart depicted in FIG. 7. That is, the output gray-scale value determining unit 103 determines an output gray-scale value from a comparison and determination process between the threshold mentioned above to be applied to the target pixel and the corrected input value, based on the process of the flowchart depicted in FIG. 7 (step S304).

The error calculating unit 104 then calculates a value obtained by subtracting the output gray-scale value from the corrected input value as a quantization error, and the error buffer 105 stores the calculated quantization error (step S305).

The error-sum calculating unit 106 then adds the input gray-scale value and the quantization error sum calculated by using the threshold matrix of FIG. 5 from the peripheral quantization error, thereby finding an error sum.

The corrected input-value calculating unit 102 then determines whether an output image has been generated for all pixel points (step S307). When an output image has not yet been generated for all pixel points ("No" at step S307), the procedure returns to step S303. When an output image has been generated for all pixel points ("Yes" at step S307), the procedure goes to end.

Figure 17A:
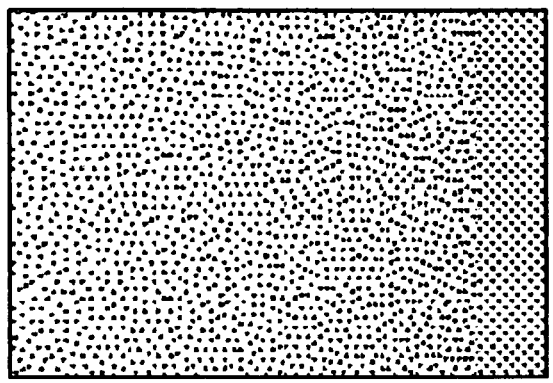
FIG. 17A is a schematic drawing of a low-density area subjected to image processing by the image processing apparatus according to the first embodiment.

FIG. 17A is a schematic drawing of a low-density area subjected to image processing by the image processing apparatus according to the first embodiment. In this case, the input gray-scale values are switched in two steps with 22 to select thresholds. When the input gray-scale value is equal to or less than 22, thresholds depicted in FIG. 4B are used. When the input gray-scale value is more than 22, the threshold matrixes depicted in FIG. 2 are used. The process result is as depicted in FIG. 17A. With this threshold switching in two steps, the occurrence of isolated points in a low-density region can be suppressed, thereby achieving image processing with less graininess.

Figure 17B:
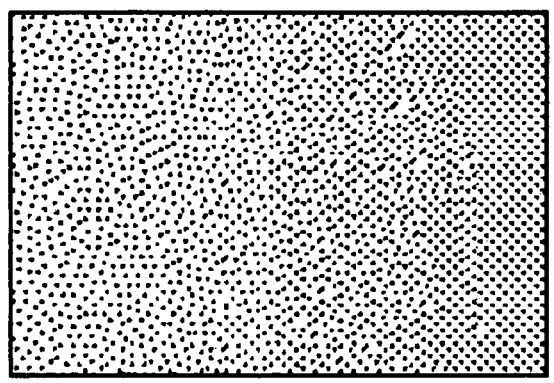
FIG. 17B is a schematic drawing of a low-density area subject to other image processing by the image processing apparatus according to the first embodiment.

FIG. 17B is a schematic drawing of a low-density area subject to other image processing by the image processing apparatus according to the first embodiment. In this case, the input gray-scale values are switched in three steps with 17 and 22 to select thresholds. When the input gray-scale value is equal to or less than 17, thresholds depicted in FIG. 4B are used. When the input gray-scale value is more than 17 and equal to or less than 22, the threshold matrixes depicted in FIG. 3 are used. When the input gray-scale value is more than 22, thresholds depicted in FIG. 2 are used. The process result is as depicted in FIG. 17B. With this threshold switching in three steps, the occurrence of isolated points in a low-density region can be suppressed, and a distortion near the switched gray-scale value can be suppressed, thereby achieving image processing with less graininess.

Figure 17C:
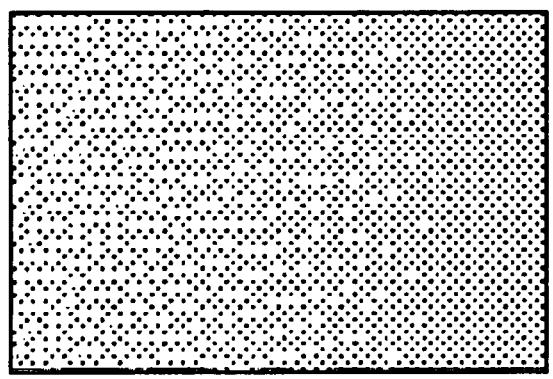
FIG. 17C is a schematic drawing of a low-density area subjected to image processing by an image processing apparatus according to a conventional example.

FIG. 17C is a schematic drawing of a low-density area subjected to image processing by an image processing apparatus according to a conventional example. In this case, for all input gray-scale values, the same threshold matrixes depicted in FIG. 2 are used without threshold switching, and the process result is as depicted in FIG. 17C. In this case, compared with the process results of the image processing apparatus according to the first embodiment of the present invention depicted in FIGS. 17A and 17B, the occurrence of isolated points in a low-density region is conspicuous, and image processing is in a state with more graininess.

Also, in the first embodiment, the configuration is such that the number of output gray-scale levels is four. However, the configuration based on the present invention may be such that the number of output gray-scale levels is less than four or more than four, or may be such that the number of output gray-scale levels is varied depending on the magnitude of the input gray-scale value or depending on the position of the target pixel.

Furthermore, in the first embodiment, the minimized average error method is used for a halftone process. The configuration based on the present invention is not restricted to this, and may use, for example, an error diffusion process.

(1.4. Effects)

In this manner, according to the image processing apparatus according to the first embodiment, for image data in a low-density region or a high-density region, an output gray-scale value is determined based on the input gray-scale value by using thresholds with a plurality of degrees of flexibility as being switched, thereby performing a threshold process with less roughness depending on each density region. Therefore, the occurrence of isolated points in a low-density region or a high-density region can be suppressed, and image processing with less roughness, excellent dispersion, and high image quality can be performed.

2. Second Embodiment

Figures 18, 19:
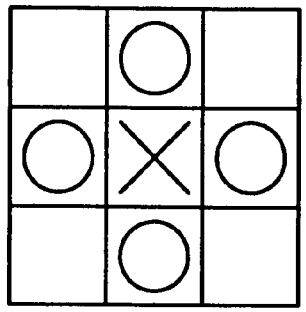
FIG. 18 is a schematic drawing of a threshold matrix for use in an image processing apparatus according to a second embodiment.
FIG. 19 is a drawing of one example of threshold matrixes for use in an image processing apparatus according to a third embodiment.

FIG. 18 is a schematic drawing of a threshold matrix for use in an image processing apparatus according to a second embodiment. With reference to FIG. 18, the image processing apparatus according to the second embodiment is explained, mainly focusing on the difference from the first embodiment.

In the image processing apparatus according to the first embodiment, the configuration is such that, when the input gray-scale value is equal to or less than 18, the threshold selecting unit 107 selects a threshold to be applied to the target pixel depending on the relation between the input gray-scale values and the thresholds depicted in FIG. 4B. In the case of the image processing apparatus according to the second embodiment, the configuration is such that a threshold to be applied to the target pixel is determined from input gray-scale values near the target pixel depicted in FIG. 18.

Now, in the case where the target pixel to be processed is located at a position indicated by a cross in FIG. 18, a value obtained by averaging input gray-scale values of four surrounding pixels indicated by circles is taken as an average input gray-scale value. With the average input gray-scale value from these four pixels as an input gray-scale value, it is determined which thresholds of FIGS. 2, 3, and 4B are used.

Here, in the image processing apparatus according to the second embodiment, the configuration is such that thresholds are selected from the surrounding input gray-scale values except the target pixel. The configuration based on the present invention is not restricted to this, and may be such that, for example, input gray-scale values of five pixels including the target pixel indicated by a cross and the four surrounding pixels indicated by circles in FIG. 15 are averaged, and with the resultant value as an average input gray-scale value, thresholds are selected.

In this manner, thresholds are selected based on not the input gray-scale value of the target pixel but the average value of the input gray-scale values of the surrounding pixels or a value obtained by averaging the input gray-scale values of the target pixel values and the surrounding pixels. With this, even when noise occurs at the target pixel and a normal value cannot be obtained, it is possible to suppress an abrupt change of the threshold due to the influence of this noise. Therefore, image processing with less noise influence, less roughness, and high image quality can be achieved.

3. Third Embodiment

FIG. 19 is a drawing of one example of threshold matrixes for use in an image processing apparatus according to a third embodiment. With reference to FIG. 19, the image processing apparatus according to the third embodiment is explained, mainly focusing on the difference from the first embodiment.

In the first embodiment, the threshold selecting unit 107 is configured to determine a threshold from the threshold matrixes of any one of FIG. 2, 3, or 4B. In the third embodiment, in place of FIG. 4B, the threshold matrixes depicted in FIG. 19 are used to determined a threshold.

When the threshold matrixes depicted in FIG. 19 are used for an image with a low input gray-scale value, such as an input image formed only with a gray-scale value of 16, as with the threshold matrixes in FIG. 3, the output image is represented generally by either one of output gray-scale values of 0 and 170. Also, the output gray-scale value is 0 or 170 at pixel positions corresponding to (x, y)=(0, 0), (1, 0), (3, 0), (0, 1), (1, 1), (2, 1), (1, 2), (2, 2), (3, 2), (0, 3), (2, 3), and (3, 3), and only the output gray-scale value of 0 occurs at other pixel positions. That is, when an image with a low gray-scale value, dots tend to be laid out as being further dispersed compared with the case of using the thresholds based on FIG. 3.

That is, as the input gray-scale value is lower, the threshold with a higher degree of flexibility in pixel-value distribution of the output image is used. The threshold matrixes depicted in FIG. 19 are preferably designed so that, for an input image formed only with an input gray-scale value near 18, an average quantization error is close to 0. However, this design is not restrictive.

In the image processing apparatus according to the third embodiment, the configuration is such that thresholds are determined by using any of threshold matrixes of FIGS. 2, 3, and 19. However, the image processing apparatus according to the third embodiment is not restricted to this configuration, and may be configured in a more fragmented manner such that, for example, thresholds are determined based on FIG. 19 when the input gray-scale value is more than 14 and equal to or less than 18, whilst thresholds are determined based on the relation between the input gray-scale values and the thresholds depicted in FIG. 4B when the input gray-scale value is equal to or less than 14.

Also, such a configuration is possible that thresholds with more various degree of flexibility are used based on the magnitude of the input gray-scale value.

In this manner, by setting the average quantization error as having a constant value, a phenomenon where dots or white patches abruptly occur due to a change in the average quantization error or can be normally suppressed. With this, image processing with the occurrence of dots or white patches being suppressed and with less roughness and high image quality can be performed.

Furthermore, by setting the average quantization error as having a constant value of 0, the average quantization error is 0 when the input data represents 0 or 255. Therefore, when the average quantization is set at 0 in other intermediate regions, an abrupt change can be further suppressed even when a threshold is selected. With this, image processing with less roughness and high image quality can be performed.

Still further, by switching between thresholds with various degrees of flexibility, threshold patterns suitable for the input gray-scale value can be finely switched. Therefore, fine image processing with less noise in a wide range of input gray-scale values can be achieved.

For example, when switching is performed with two thresholds, a change in output gray-scale values tends to be large at a switching point. To get around this problem, fine fragmentation of threshold selection is performed to smooth the change in output gray-scale value, thereby avoiding an abrupt change in output gray-scale value and causing the change to become stepwise.

4. Fourth Embodiment

Figures 20, 21:
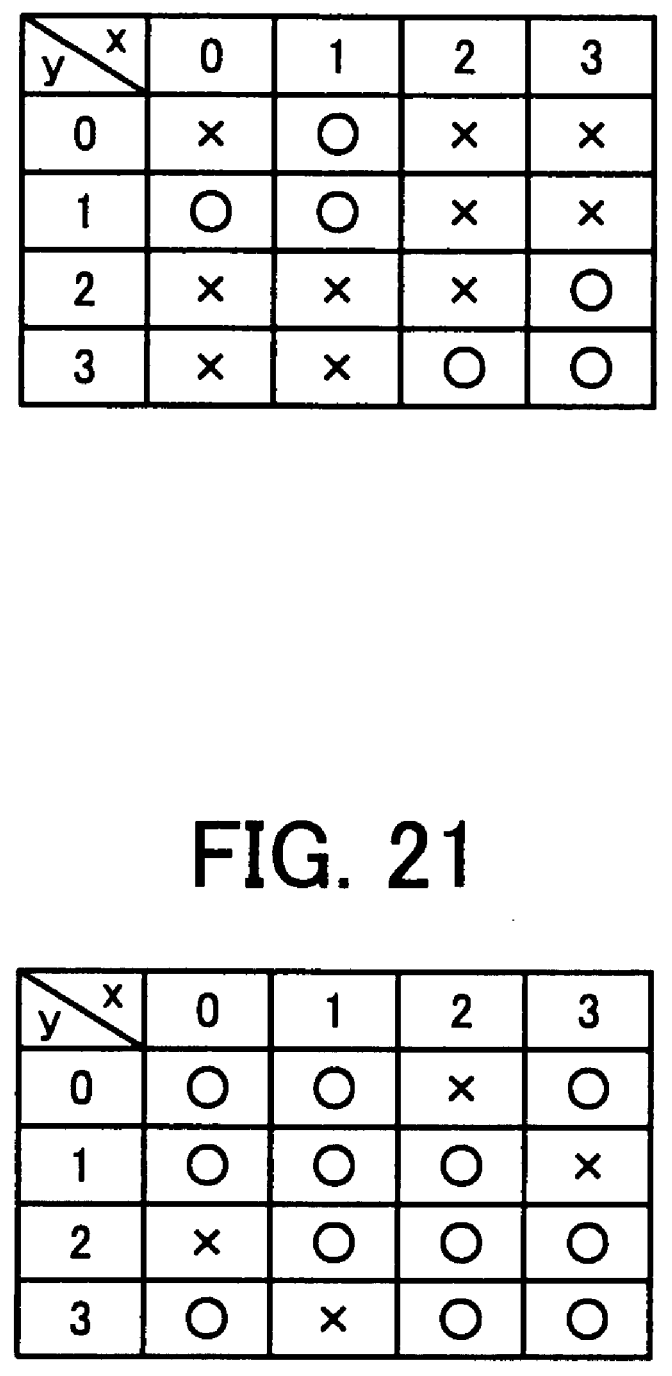

FIG. 20 is a schematic drawing of one example of a threshold matrix for use in an image processing apparatus according to a fourth embodiment. FIG. 21 is a schematic drawing of one example of another threshold matrix for use in an image processing apparatus according to the fourth embodiment. With reference to FIGS. 20 and 21, the image processing apparatus according to the fourth embodiment is explained, mainly focusing on the difference from the first embodiment.

In the image processing apparatus according to the fourth embodiment, the threshold selecting unit 107 determines a threshold based on the input gray-scale value of the target pixel to be processed. That is, to determine a threshold applied to the target pixel, the threshold matrixes depicted in FIG. 2 are used when the input gray-scale value is more than 22, the relation between the input gray-scale values and the thresholds depicted in FIG. 4B and the matrix in FIG. 20 are used when the input gray-scale value is more than 18 and equal to or less than 22, the relation between the input gray-scale values and the thresholds depicted in FIG. 4B and the matrix in FIG. 21 are used when the input gray-scale value is more than 14 and equal to or less than 18, and the relation between the input gray-scale values and the thresholds depicted in FIG. 4B are used when the input gray-scale value is equal to or less than 14. The determined threshold is sent to the output gray-scale value determining unit 103.

Here, a method of determining a threshold to be applied to the target pixel by using the relation the input gray-scale values and the thresholds depicted in FIG. 4B and the matrix depicted in FIG. 20 when the input gray-scale value is more than 18 and equal to or less than 22 is explained.

In the matrix of FIG. 20, positions indicated by crosses are assumed to each have a fixed output gray-scale value of 0. Also, positions indicated by circles are those that can take either one of output gray-scale values of 0 and 170. Therefore, when the position of the target pixel is located at a position corresponding to a cross, the threshold A, the threshold B, and the threshold C all take 255.

Also, in the case of a position corresponding to a circle, the threshold A, the threshold B, and the threshold C are determined based on the relation between the input gray-scale values and the thresholds. For examples, when the input gray-scale value of the target pixel is 18, the thresholds A and B are 32 and the threshold C is 255 from FIG. 4B.

Also when the input gray-scale value is more than 14 and equal to or less than 18, thresholds are determined based on the relation between the input gray-scale values and the thresholds and the matrix depicted in FIG. 18.

In this manner, by combining the process depicted in FIG. 21 and the relation of FIG. 4B, a function similar to a function of using the thresholds in FIG. 3 is performed. FIG. 21 depicts the matrix for performing such a process. Here, the configuration is such that 0 is always output at pixel points indicated by crosses, whilst a threshold process is performed with thresholds obtained from the relation of FIG. 4B at other pixel points indicated by circle.

Here, the configuration is such that, when the target pixel is located at a position corresponding to a cross, 255 is determined to be used for the thresholds A, B, and C. Alternatively, the configuration may be such that a mechanism is provided that forces the output gray-scale value to be 0 when the output gray-scale value determining unit 103 recognizes such a pixel position.

5. Hardware Configuration and Others

Figure 22:
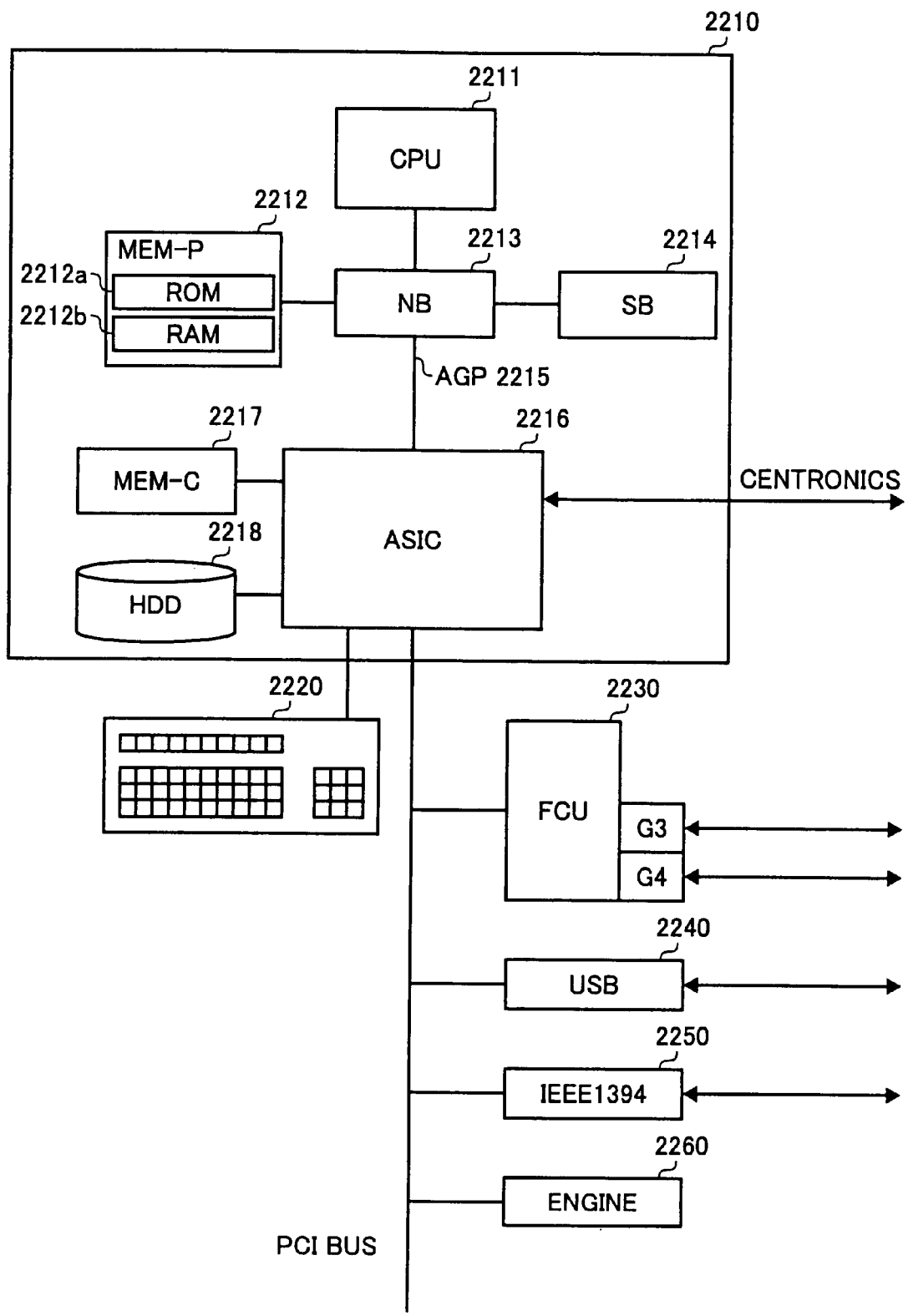
FIG. 22 is a block diagram of a hardware configuration of a forming apparatus having incorporated therein the image processing apparatus according to the embodiments.

FIG. 22 is a block diagram of a hardware configuration of a forming apparatus having incorporated therein the image processing apparatus according to the embodiments. This image forming apparatus is configured to be a Multifunction Product (MFP) with multifunction, such as facsimile and scanner functions. As depicted in the drawing, this MFP is configured with a controller 2210 and an engine unit 2260 being connected to each other via a Peripheral Component Interconnect (PCI) bus. The controller 2210 is a controller that controls an input from an FCUI/F 2230 and an operation displaying unit 2220 by performing, for example, control over the entire MFP, image display control, various controls, and image processing control. The engine unit 2260 is an image processing engine connectable to the PCI bus, and includes, for example, image processing portions for error diffusion, gamma transformation on the obtained image data, and others.

The controller 2210 includes a Central Processing Unit (CPU) 2211, a northbridge (NB) 2213, a system memory (MEM-P) 2212, a southbridge (SB) 2214, a local memory (MEM-C) 2217, an Application Specific Integrated Circuit (ASIC) 2216, and a hard disk drive (HDD) 2218, with the northbridge 2213 and the ASIC 2216 being connected therebetween via an Accelerated Graphics Port (AGP) bus 2215. Also, the MEM-P 2212 further includes a Read Only Memory (ROM) 2212a and a Random Access Memory (RAM) 2212b.

The CPU 2211 performs controls over the entire MFP, includes a chip set formed of the NB 2213, the MEM-P 2212, and the SB 2214, and is connected to other devices via this chip set.

The NB 2213 is a bridge for connection of the CPU 2211 with the MEM-P 2212, the SB 2214, and the AGP 2215, and includes a memory controller that controls reading and writing with respect to the MEM-P 2212, a PCI master, and an AGP target.

The MEM-P 2212 is a system memory for use as, for example, a memory for storing programs and data or a memory for developing programs and data, and includes the ROM 2212a and the RAM 2212b. The ROM 2212a is a read-only memory for use as a memory for storing programs and data, whilst the RAM 2212b is a writable and readable memory for use as, for example, a memory for developing programs and data or an image rendering memory at the time of image processing.

The SB 2214 is a bridge for connection of the NB 2213 with PCI devices and peripheral devices. This SB 2214 is connected to the NB 2213 via the PCI bus. To this PCI bus, the FCUI/F 2230 is also connected, for example.

The ASIC 2216 is an Integrated Circuit (IC) dedicated to multimedia information processing, contains hardware components for multimedia information processing, and serves as a bridge for connecting the AGP 2215, the PCI bus, the HDD 2218, and the MEM-C 2217.

The ASIC 2216 includes a PCI target, an AGP master, an arbiter (ARB), which is a core of the ASIC 2216; a memory controller that controls the MEM-C 2217, and a plurality of Direct Memory Access Controllers (DMACs) for image data rotation and others by a hardware logic and others. Between these components included in the ASIC 2216 and the engine unit 2260 via the PCI bus, a Universal Serial Bus (USB) 2240, and the Institute of Electrical and Electronics Engineers (IEEE) 1394 interface 2250 are connected.

The MEM-C 2217 is a local memory for use as an image buffer for transmission or a coding buffer. The HDD 2218 is a storage for storing image data, programs, font data, and forms.

The AGP 2215 is a bus interface for a graphics accelerator card suggested for increasing the speed of graphic processing, and increases the speed of the graphics accelerator card by directly accessing the MEM-P 2212 with a high throughput.

The operation displaying unit 2220 connected to the ASIC 2216 accepts an operation input from the operator, and transmits the accepted operation input information to the ASIC 2216.

Note that the image processing program executed on the MFP having incorporated therein the image processing apparatus according to the embodiments is provided as being previously incorporated in a ROM or the like.

The image processing program executed on the MFP having incorporated therein the image processing apparatus according to the embodiments may be configured to be provided as being recorded in readable recording medium such as an installable format or an executable format on a computer-readable recording medium, such as a Compact-Disk Read-Only Memory (CD-ROM), a flexible disk (FD), a Compact-Disk Readable (CD-R), or a Digital Versatile Disk (DVD).

Furthermore, the image processing program executed on the MFP having incorporated therein the image processing apparatus according to the embodiments may be configured to be provided as being stored on a computer connected to a network, such as the Internet, and then being downloaded via the network. Also, the image processing program executed on the MFP having incorporated therein the image processing apparatus according to the embodiments may be configured to be provided or distributed through a network, such as the Internet.

The image processing program executed on the MFP having incorporated therein the image processing apparatus according to the embodiments has a module configuration including each of the components explained above (the image receiving unit 101, the corrected input-value calculating unit 102, the output gray-scale value determining unit 103, the error calculating unit 104, the error buffer 105, the error-sum calculating unit 106, the threshold selecting unit 107, and others). As actual hardware, with the CPU (processor) reading the image processing program from the ROM for execution, each unit explained above is loaded onto a main storage device, thereby generating thereon the image receiving unit 101, the corrected input-value calculating unit 102, the output gray-scale value determining unit 103, the error calculating unit 104, the error buffer 105, the error-sum calculating unit 106, the threshold selecting unit 107, and others.

The embodiments and modified examples of the present invention set forth above are merely by way of example for explanation, and the present invention is not restricted to these specific examples explained herein.

As has been explained above, the image processing apparatus, the image processing method, and the computer program that causes a computer to perform the method according to the present invention are useful for image forming technology, and is particularly suitable for image processing technology with high image quality.

According to an embodiment of the present invention, in image processing where a corrected input-value calculating unit calculates a corrected input value by assigning a predetermined weight to an error value near a target pixel of the input image information and adding the error value to an input gray-scale value; a threshold selecting unit selects a threshold based on an input gray-scale value of at least one of the target pixel of the input image information and a pixel near the target pixel; an output gray-scale value determining unit determines an output gray-scale value based on the corrected input value and the threshold; and an error calculating unit calculates a difference between the output gray-scale value and the corrected input value as an error value, and transmits the calculated error value to the corrected input-value calculating unit, wherein when a degree of flexibility is defined as representing a degree of the number of pixels that can take different output values as a result of threshold processing on an input image formed only with a predetermined gray-scale value, the threshold selecting unit selects a threshold from at least two types of threshold tables with same period and different degrees of flexibility based on the input gray-scale value of at least one of the target pixel and the pixel near the target pixel. With this configuration, the occurrence of roughness can be suppressed, and also a distortion in switching at the time of threshold selection can be suppressed. Therefore, an effect can be achieved such that an image processing apparatus capable of performing image processing with high image quality can be provided.

According to another embodiment of the present invention, in a low gray-scale image region of an input image, the threshold selecting unit selects a threshold with a high degree of flexibility for an input gray-scale value with a lower gray-scale level and selects a threshold with a low degree of flexibility for an input gray-scale value with a higher gray-scale level. With this, in the low gray-scale image region, dispersibility can be increased, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, in a high gray-scale image region of an input image, the threshold selecting unit selects a threshold with a high degree of flexibility for an input gray-scale value with a higher gray-scale level and selects a threshold with a low degree of flexibility for an input gray-scale value with a lower gray-scale level. With this, in the high gray-scale image region, dispersibility can be increased, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, when the input gray-scale value is considerably high or considerably low, the threshold selecting unit selects an approximately constant threshold for the input gray-scale value irrespectively of the pixel position. With this, dispersibility can be increased, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, when a pixel that can take different output values for same input pixel value is referred to as a flexible pixel, near an input gray-scale value where switching is made between the threshold table with a high degree of flexibility and a threshold table with a low degree of flexibility, the threshold selecting unit selects a threshold from a threshold table serving as a threshold table with a high degree of flexibility containing, in addition to flexible pixels in the threshold table with the low degree of flexibility, flexible pixels at pixel positions near pixel positions of the flexible pixels in the threshold table with the low degree of flexibility. With this configuration, dispersibility can be increased, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the threshold selecting unit selects a threshold from out of threshold tables with an approximately same average quantization error. With this, dispersibility can be increased, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the threshold selecting unit selects a threshold from out of threshold tables with the average quantization error being approximately 0. With this, dispersibility can be increased, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, in image processing where a corrected input-value calculating unit calculates a corrected input value by assigning a predetermined weight to an error value near a target pixel of the input image information and adding the error value to an input gray-scale value; a threshold selecting unit selects a threshold based on an input gray-scale value of at least one of the target pixel of the input image information and a pixel near the target pixel; an output gray-scale value determining unit determines an output gray-scale value based on the corrected input value and the threshold; and an error calculating unit calculates a difference between the output gray-scale value and the corrected input value as an error value, and transmits the calculated error value to the corrected input-value calculating unit, wherein the output gray-scale value determining unit determines an output gray-scale value while using an approximately constant threshold irrespectively of a pixel position and, for a specific pixel position, switching between a first process of determining one specific type of output gray-scale value and a second process of determining an output gray-scale value by using a threshold based on the pixel position. With this configuration, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the output gray-scale value determining unit performs the first process on a lower gray-scale side in a low gray-scale image region, and performs the second process on a high gray-scale side in the low gray-scale image region. With this, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the output gray-scale value determining unit performs the first process on the low gray-scale side with many of the specific image pixels in the first process. With this, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the output gray-scale value determining unit performs the first process on a higher gray-scale side in a high gray-scale image region, and performs the second process on a low gray-scale side in the high gray-scale image region. With this, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the output gray-scale value determining unit performs the first process on the high gray-scale side with many of the specific image pixels in the first process. With this, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, the output gray-scale value determining unit determines an output gray-scale value by also using, by switching, a threshold that is approximately constant with respect to a target pixel position. With this, the occurrence of roughness can be suppressed, and also a distortion in switching at the time of threshold selection can be suppressed. Therefore, an effect can be achieved such that an image processing apparatus capable of performing image processing with high image quality can be provided.

According to still another embodiment of the present invention, in image processing where a corrected input-value calculating unit calculates a corrected input value by assigning a predetermined weight to an error value near a target pixel of the input image information and adding the error value to an input gray-scale value; a threshold selecting unit selects a threshold based on an input gray-scale value of at least one of the target pixel of the input image information and a pixel near the target pixel; an output gray-scale value determining unit determines an output gray-scale value based on the corrected input value and the threshold; and an error calculating unit calculates a difference between the output gray-scale value and the corrected input value as an error value, and transmits the calculated error value to the corrected input-value calculating unit, wherein when a degree of flexibility is defined as representing a degree of the number of pixels that can take different output values as a result of threshold processing on an input image formed only with a predetermined gray-scale value, the threshold selecting unit selects a threshold from at least two types of threshold tables with same period and different degrees of flexibility based on the input gray-scale value of at least one of the target pixel and the pixel near the target pixel. With this configuration, the occurrence of roughness can be suppressed, and also a distortion in switching at the time of threshold selection can be suppressed. Therefore, an effect can be achieved such that an image processing method capable of performing image processing with high image quality can be provided.

According to still another embodiment of the present invention, threshold selection is performed in a manner such that, in a low gray-scale image region of an input image, a threshold with a high degree of flexibility is selected for an input gray-scale value with a lower gray-scale level and a threshold with a low degree of flexibility is selected for an input gray-scale value with a higher gray-scale level. With this, in the low gray-scale image region, dispersibility can be increased, the occurrence of roughness can be suppressed, and also a distortion in switching at the time of threshold selection can be suppressed. Therefore, an effect can be achieved such that image processing with high image quality can be performed.

According to still another embodiment of the present invention, threshold selection is performed in a manner such that, in a high gray-scale image region of an input image, a threshold with a high degree of flexibility is selected for an input gray-scale value with a higher gray-scale level and a threshold with a low degree of flexibility is selected for an input gray-scale value with a lower gray-scale level. With this, in the high gray-scale image region, dispersibility can be increased, the occurrence of roughness can be suppressed, and also a distortion in switching at the time of threshold selection can be suppressed. Therefore, an effect can be achieved such that image processing with high image quality can be performed.

According to still another embodiment of the present invention, when the input gray-scale value is considerably high or considerably low, threshold selection is performed in a manner such that an approximately constant threshold is selected for the input gray-scale value irrespectively of the pixel position. With this, dispersibility can be increased, the occurrence of roughness can be suppressed, and also a distortion in switching at the time of threshold selection can be suppressed. Therefore, an effect can be achieved such that an image processing method capable of performing image processing with high image quality can be provided.

According to still another embodiment of the present invention, in image processing where a corrected input-value calculating unit calculates a corrected input value by assigning a predetermined weight to an error value near a target pixel of the input image information and adding the error value to an input gray-scale value; a threshold selecting unit selects a threshold based on an input gray-scale value of at least one of the target pixel of the input image information and a pixel near the target pixel; an output gray-scale value determining unit determines an output gray-scale value based on the corrected input value and the threshold; and an error calculating unit calculates a difference between the output gray-scale value and the corrected input value as an error value, and transmits the calculated error value to the corrected input-value calculating unit, wherein the output gray-scale value determining unit determines an output gray-scale value while using an approximately constant threshold irrespectively of a pixel position and, for a specific pixel position, switching between a first process of determining one specific type of output gray-scale value and a second process of determining an output gray-scale value by using a threshold based on the pixel position. With this configuration, the occurrence of roughness can be suppressed, and also a distortion in switching at the time of threshold selection can be suppressed. Therefore, an effect can be achieved such that an image processing method capable of providing an image processing apparatus capable of performing image processing with high image quality can be provided.

According to still another embodiment of the present invention, output gray-scale value determination is performed in a manner such that the first process is performed on a lower gray-scale side in a low gray-scale image region, and the second process is performed on a high gray-scale side in the low gray-scale image region. With this, the occurrence of roughness can be suppressed, and also a distortion in switching at the time of threshold selection can be suppressed. Therefore, an effect can be achieved such that an image processing method capable of performing image processing with high image quality can be provided.

According to still another embodiment of the present invention, output gray-scale value determination is performed in a manner such that the first process is performed on a higher gray-scale side in a high gray-scale image region, and the second process is performed on a low gray-scale side in the high gray-scale image region. With this, the occurrence of roughness can be suppressed, and also a distortion in switching at the time of threshold selection can be suppressed. Therefore, an effect can be achieved such that an image processing method capable of performing image processing with high image quality can be provided.

According to still another embodiment of the present invention, an effect of allowing a computer to perform the image processing method explained above can be achieved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that receives image information and determines an output gray-scale value of the image information, the image processing apparatus comprising:

a corrected input-value calculating unit to calculate a corrected input value by assigning a predetermined weight to an error value near a target pixel of the image information and adding the error value to an input gray-scale value;

a threshold selecting unit to select a threshold based on an input gray-scale value of at least one of the target pixel of the image information and a pixel near the target pixel;

an output gray-scale value determining unit to determine an output gray-scale value based on the corrected input value calculated by the corrected input-value calculating unit and the threshold selected by the threshold selecting unit; and an error calculating unit to calculate a difference between the output gray-scale value determined by the output gray-scale value determining unit and the corrected input value as an error value, and transmit the calculated error value to the corrected input-value calculating unit, wherein the threshold selecting unit selects one of at least two types of threshold tables based on the input gray-scale value of at least one of the target pixel and the pixel near the target pixel and selects a threshold from selected one of the threshold tables, and wherein the threshold tables have a same period and different degrees of flexibility, where the degree of flexibility is defined as representing a number of pixels that can take different output values as a result of threshold processing on an input image formed only with a predetermined gray-scale value.

2. The image processing apparatus according to claim 1, wherein in a low gray-scale image region of an input image, the threshold selecting unit selects one of the threshold tables with a high degree of flexibility for an input gray-scale value with a lower gray-scale level and selects one of the threshold tables with a low degree of flexibility for an input gray-scale value with a higher gray-scale level.

3. The image processing apparatus according to claim 1, wherein in a high gray-scale image region of an input image, the threshold selecting unit selects one of the threshold tables with a high degree of flexibility for an input gray-scale value with a higher gray-scale level and selects one of the threshold tables with a low degree of flexibility for an input gray-scale value with a lower gray-scale level.

4. The image processing apparatus according to claim 1, wherein when a pixel that can take different output values for same input pixel value is referred to as a flexible pixel, near an input gray-scale value where switching is made between the threshold table with a high degree of flexibility and a threshold table with a low degree of flexibility, the threshold selecting unit selects a threshold from a threshold table serving as a threshold table with a high degree of flexibility containing, in addition to flexible pixels in the threshold table with the low degree of flexibility, flexible pixels at pixel positions near pixel positions of the flexible pixels in the threshold table with the low degree of flexibility.

5. The image processing apparatus according to claim 1, wherein the threshold selecting unit selects a threshold from threshold tables with an approximately same average quantization error.

6. The image processing apparatus according to claim 5, wherein the threshold selecting unit selects a threshold from threshold tables with the average quantization error being approximately 0.

7. An image processing method in an image processing apparatus, the image processing method comprising:
- first calculating including calculating a corrected input value by assigning a predetermined weight to an error value near a target pixel of received image information and adding the error value to an input gray-scale value;
- selecting a threshold based on an input gray-scale value of at least one of the target pixel of the image information and a pixel near the target pixel;
- determining an output gray-scale value based on the corrected input value calculated at the calculating and the threshold selected; and
- second calculating including calculating a difference between the output gray-scale value determined at the determining and the corrected input value as an error value, wherein the error value is used at the first calculating, wherein the selecting includes selecting one of at least two types of threshold tables based on the input gray-scale value of at least one of the target pixel and the pixel near the target pixel and selecting a threshold from selected one of the threshold tables, wherein the threshold tables have a same period and different degrees of flexibility, where the degree of flexibility is defined as representing a number of pixels that can take different output values as a result of threshold processing on an input image formed only with a predetermined gray-scale value.

8. The image processing method according to claim 7, wherein in a low gray-scale image region of an input image, the selecting includes selecting one of the threshold tables with a high degree of flexibility for an input gray-scale value with a lower gray-scale level and selecting one of at the threshold tables with a low degree of flexibility for an input gray-scale value with a higher gray-scale level.

9. The image processing method according to claim 7, wherein in a high gray-scale image region of an input image, the selecting includes selecting one of at the threshold tables with a high degree of flexibility for an input gray-scale value with a higher gray-scale level and selecting one of at the threshold tables with a low degree of flexibility for an input gray-scale value with a lower gray-scale level.

10. A non-transitory computer-readable recording medium having recorded thereon a computer program that causes a computer to perform the image processing method according to claim 7.

* * * * *